US012207718B1

(12) United States Patent
Zheng

(10) Patent No.: US 12,207,718 B1
(45) Date of Patent: Jan. 28, 2025

(54) ROTATING CONDUCTIVE STRUCTURE, HANDLE AND HAIRDRESSING DEVICE

(71) Applicant: Zhuhua Zheng, Lishui (CN)

(72) Inventor: Zhuhua Zheng, Lishui (CN)

( * ) Notice: Subject to any disclaimer, the term of this patent is extended or adjusted under 35 U.S.C. 154(b) by 0 days.

(21) Appl. No.: 18/794,566

(22) Filed: Aug. 5, 2024

(30) Foreign Application Priority Data

Jul. 15, 2024 (CN) ......................... 202421662894.6

(51) Int. Cl.
*A45D 1/04* (2006.01)
*H01R 39/64* (2006.01)

(52) U.S. Cl.
CPC ............... *A45D 1/04* (2013.01); *H01R 39/64* (2013.01)

(58) Field of Classification Search
CPC ................................. A45D 1/04; H01R 39/64
See application file for complete search history.

(56) References Cited

FOREIGN PATENT DOCUMENTS

| | | | |
|---|---|---|---|
| CN | 105877097 A | 8/2016 | |
| CN | 218605457 U | 3/2023 | |
| CN | 219719987 U | 9/2023 | |
| GB | 2141927 A * | 1/1985 | ............... A45D 1/04 |

* cited by examiner

*Primary Examiner* — Travis S Chambers
(74) *Attorney, Agent, or Firm* — George D. Morgan

(57) ABSTRACT

Disclosed in the present application are a rotating conductive structure, a handle and a hairdressing device. The rotating conductive structure has an axis of rotation and includes an insulating member, a conductive rotating member and a conductive fixed member. The conductive rotating member includes a first rotating portion and a second rotating portion; the conductive fixed member includes a first fixed portion and a second fixed portion, the first fixed portion is in contact with the first rotating portion, the second fixed portion is in contact with the second rotating portion; the insulating member is configured to isolate the first rotating portion from the second rotating portion; and a current passes through the first fixed portion, the first rotating portion, the hairdressing assembly, the second rotating portion and the second fixed portion in sequence to form a series circuit with a power source.

19 Claims, 16 Drawing Sheets

ROTATING CONDUCTIVE STRUCTURE, HANDLE AND HAIRDRESSING DEVICE

CROSS-REFERENCE TO RELATED APPLICATIONS

The application claims priority to Chinese patent application No. 2024216628946, filed on Jul. 15, 2024, the entire contents of which are incorporated herein by reference.

TECHNICAL FIELD

The present application belongs to the technical field of hairdressing, and particularly relates to a rotating conductive structure, a handle and a hairdressing device.

BACKGROUND

In existing hair curling bar technologies, some products have a mechanical rotation function, so that a user can wind and fix hair more conveniently in a hair curling process.

However, during rotation of hair curling bars in the prior art, heating assemblies thereof rotate along with them, resulting in strain of electric wires connected to the heating assemblies in a long-time usage process, which increases the risk of breakage of the electric wires. Once the electric wires are broken, normal usage of the hair curling bars is affected, and potential safety hazards such as electric leakage or fires may also be caused.

SUMMARY

In view of the above situations, it is necessary to provide a rotating conductive structure, a handle and a hairdressing device.

An embodiment of the present application provides the rotating conductive structure. The rotating conductive structure has an axis of rotation and comprises an insulating member, a conductive rotating member and a conductive fixed member. The conductive rotating member comprises a first rotating portion and a second rotating portion, the first rotating portion and the second rotating portion are capable of rotating around the axis of rotation, and the first rotating portion and the second rotating portion are electrically connected to a hairdressing assembly for hair styling; the conductive fixed member comprises a first fixed portion and a second fixed portion, the first fixed portion is in contact with the first rotating portion, the second fixed portion is in contact with the second rotating portion, and the conductive fixed member is fixedly mounted on a body; the insulating member is configured to isolate the first rotating portion from the second rotating portion and is configured to limit the first rotating portion and the second rotating portion so as to prevent the conductive rotating member from being deformed; and a current passes through the first fixed portion, the first rotating portion, the hairdressing assembly, the second rotating portion and the second fixed portion in sequence to form a series circuit with a power source.

According to the rotating conductive structure, when a positive pole of the power source is connected to the first fixed portion and a negative pole is connected to the second fixed portion, the current passes through the first fixed portion, the first rotating portion, the hairdressing assembly, the second rotating portion and the second fixed portion in sequence to form the series circuit with the power source. The first fixed portion is in contact with the first rotating portion, and the second fixed portion is in contact with the second rotating portion, so that when the first rotating portion, the second rotating portion and the hairdressing assembly rotate synchronously, circuit connection can be maintained. In addition, the first rotating portion, the second rotating portion and the hairdressing assembly rotate synchronously, so that even if the first rotating portion and the second rotating portion are connected to the hairdressing assembly by means of electric wires, the electric wires can also be kept relatively straight. The insulating member is provided to isolate the first rotating portion from the second rotating portion, so that the short-circuit situation caused by direct contact between the first rotating portion and the second rotating portion is reduced.

Optionally, further comprising an insulating protective sleeve, wherein the insulating protective sleeve is provided with a limiting rotating cavity, the conductive rotating member is rotatably connected to the limiting rotating cavity, and the insulating protective sleeve is configured to prevent the insulating member, the conductive rotating member and the conductive fixed member from deviating during operation of the hairdressing assembly.

Optionally, wherein at least one of the first rotating portion and the first fixed portion is of an annular structure, and at least one of the second rotating portion and the second fixed portion is of an annular structure; and the first rotating portion is in surface contact with the first fixed portion all the time in a rotating process, and the second rotating portion is in surface contact with the second fixed portion all the time in a rotating process.

Optionally, wherein the first rotating portion comprises a first rotating ring and a first conductive strip, an axis of the first rotating ring overlaps the axis of rotation, and the first conductive strip extends along the axis of rotation and is connected to the first rotating ring; the second rotating portion comprises a second rotating ring and a second conductive strip, an axis of the second rotating ring overlaps the axis of rotation, the second conductive strip is connected to the second rotating ring and extends along the axis of rotation, and the second conductive strip is located on one side away from the first rotating ring; and the first conductive strip penetrates through the second rotating ring, and is spaced apart from the second rotating ring.

Optionally, wherein the first fixed portion comprises a first fixed ring, and at least a part of the first fixed ring is embedded in the first rotating ring.

Optionally, wherein the first fixed ring is provided with a notch, so that the first fixed ring is capable of being elastically deformed and shrunk to be completely embedded in the first rotating ring.

Optionally, wherein an outer circumferential surface of the first fixed ring is a smooth surface so as to be in surface contact with an inner circumferential surface of the first rotating portion.

Optionally, wherein the first fixed ring comprises at least one first connecting section and at least one first wave section, the first wave section comprises at least one first outer convex edge, and an outer surface of the first outer convex edge is configured to abut against an inner circumferential surface of the first rotating portion.

Optionally, wherein there are two first wave sections, each of two ends of the first connecting section is fixedly connected to one end of one of the two first wave sections, and each of the first wave sections is provided with at least two first outer convex edges.

Optionally, wherein the insulating member comprises an insulating ring, and an axis of the insulating ring overlaps the axis of rotation; and the insulating ring is made of an insulating material, and the insulating ring is located between the first rotating portion and the second rotating portion and is configured to control a spacing distance between the first rotating portion and the second rotating portion.

Optionally, wherein the insulating member further comprises a blocking convex edge provided on an outer circumferential surface of the insulating ring, and the blocking convex edge is configured to prevent the second fixed portion from being separated from the second rotating portion when the first rotating portion rotates.

Optionally, wherein the first fixed portion further comprises a first connecting strip connected to the first fixed ring, and the first connecting strip extends out of the first rotating ring to be connected to an electric wire.

Optionally, wherein the insulating protective sleeve comprises: an insulating front shell, wherein the limiting rotating cavity is located in the insulating front shell and is configured to accommodate the first rotating portion, the second rotating portion, the first fixed portion, the second fixed portion and the insulating member; an insulating rear shell, wherein the insulating rear shell is detachably connected to one end of the insulating front shell; and an insulating sleeve shell, wherein the insulating sleeve shell is sleeved on the insulating front shell; the insulating rear shell is configured to limit the first rotating portion, the second rotating portion, the first fixed portion, the second fixed portion and the insulating member to the limiting rotating cavity; and the insulating protective sleeve is sleeved on the insulating front shell so as to limit the insulating front shell to prevent the conductive rotating member from being deformed and deviating.

Optionally, further comprising a rotating driving portion, wherein the rotating driving portion comprises: a driving source which is mounted on an outer shell and is configured to provide power; a connecting shell which is configured to be connected to the hairdressing assembly; and a rotating shaft, wherein an axis of the rotating shaft overlaps the axis of rotation, and the rotating shaft is fixedly mounted on one side of the connecting shell; and an output shaft of the driving source is fixedly connected to the connecting shell and/or the rotating shaft, and the rotating shaft is configured to limit the insulating member, the first rotating portion and the second rotating portion so as to drive the insulating member, the first rotating portion and the second rotating portion to rotate synchronously when the driving source drives the connecting shell and/or the rotating shaft to rotate.

Optionally, wherein the insulating rear shell drives the insulating rear shell to abut against one side of the connecting shell facing away from the hairdressing assembly, and the insulating front shell is in surface contact with the connecting shell by means of at least a part of an abutting surface so as to reduce friction between the insulating front shell and the connecting shell. An embodiment of the present application provides a handle, comprising a handle body and the rotating conductive structure according to claim 1, wherein the rotating conductive structure is mounted in the handle body; and the handle further comprises a rotating resetting structure, one part of the rotating resetting structure is connected to the handle body, the other part is configured to be connected to the hairdressing assembly, and the rotating resetting structure is configured to achieve automatic resetting after the hairdressing assembly rotates a preset number of turns.

An embodiment of the present application provides a hairdressing device, comprising a handle body, a hairdressing assembly and the rotating conductive structure, wherein the hairdressing assembly is located at one end of the handle body, and the rotating conductive structure is connected to the hairdressing assembly and is configured to drive the hairdressing assembly to rotate relative to the handle body.

Optionally, wherein the hairdressing assembly comprises: a hair curling shaft, wherein the hair curling shaft is connected to the rotating conductive structure, so that the hair curling shaft and the conductive rotating member rotate synchronously; and a clamping cooperating member, wherein the clamping cooperating member is connected to the hair curling shaft and cooperates with the hair curling shaft to clamp hair; the hair curling shaft comprises a first clamping bar and a second clamping bar, the first clamping bar and the second clamping bar are capable of being opened relative to each other or performing clamping, and the clamping cooperating member is connected to the first clamping bar; and the clamping cooperating member is capable of being opened relative to the first clamping bar so as to place the hair between the clamping cooperating member and the first clamping bar, or the clamping cooperating member drives the first clamping bar to move synchronously to enable the first clamping bar to be opened relative to the second clamping bar.

Optionally, wherein the hairdressing assembly further comprises a functional member, the functional member is located in the hair curling shaft, and the functional member is electrically connected to the conductive rotating member; and a current passes through the first fixed portion, the first rotating portion, the functional member, the second rotating portion and the second fixed portion in sequence.

Optionally, wherein the hairdressing assembly comprises: a hair curling shaft, wherein the hair curling shaft is connected to the rotating conductive structure, so that the hair curling shaft and the conductive rotating member rotate synchronously; and a plurality of bristles, wherein the plurality of bristles are provided in the hair curling shaft in an array; and the bristles are capable of going deep to roots of hair to help to fix the hair so as to facilitate winding of the hair.

According to the rotating conductive structure, the handle and the hairdressing device, through cooperation of the first rotating portion, the first fixed portion, the insulating member, the second rotating portion and the second fixed portion, the first rotating portion and the second rotating portion are in contact with the first fixed portion and the second fixed portion continuously and correspondingly in a rotating process, so that in a rotating process of the hairdressing assembly, the situation of bending and even pulling-apart of the electric wires can be avoided.

REFERENCE NUMERALS

Figure 1:
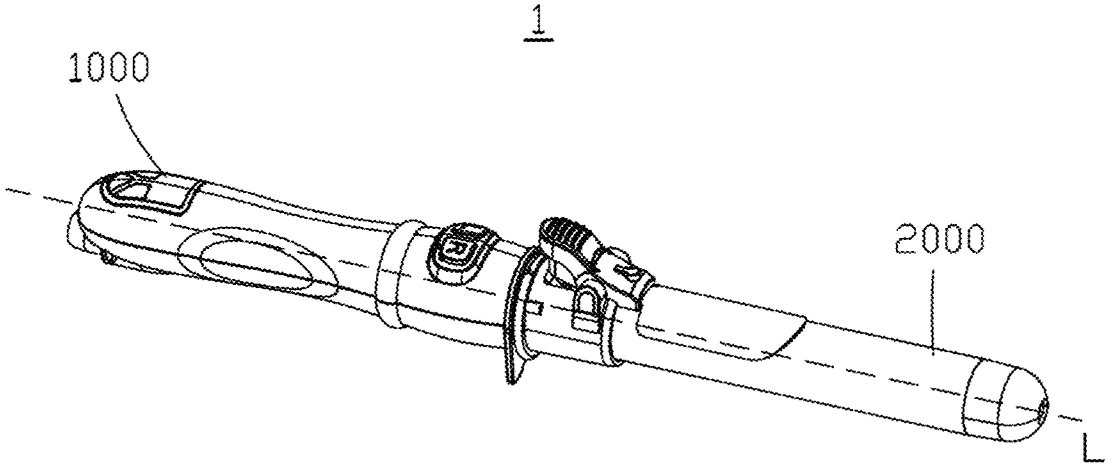
FIG. 1 is a three-dimensional structural diagram of a hairdressing device in an embodiment of the present application.

1. hairdressing device;

1000. handle;

100. rotating conductive structure;

10. conductive rotating member; 11. first rotating portion; 111. first rotating ring; 1111. first ring; 1112. first stop ring; 112. first conductive strip; 12. second rotating portion; 121. second rotating ring; 1211. second ring; 1212. second stop ring; 1213. second avoiding groove; 122. second conductive strip;

20. conductive fixed member; 21. first fixed portion; 211. first fixed ring; 2111. first connecting section; 2112. first wave section; 2112*a*. first outer convex edge; 2112*b*. first connecting edge; 2113. first notch; 212. first connecting strip; 22. second fixed portion; 221. second fixed ring; 2211. second connecting section; 2212. second wave section; 2212*a*. second outer convex edge; 2212*b*. second connecting edge; 2213. second notch; 222. second connecting strip;

30. insulating member; 31. insulating ring; 311. first avoiding groove; 32. blocking convex edge;

40. insulating protective sleeve; 41. insulating front shell; 411. first clamping groove; 412. second clamping groove; 42. insulating rear shell; 421. positioning convex block; 43. insulating sleeve shell; 431. positioning groove; 44. limiting rotating cavity;

50. rotating driving portion; 51. driving source; 511. output shaft; 52. connecting shell; 53. rotating shaft; 531. first communication groove; 532. second communication groove; 200. handle body;

60. outer shell; 61. positioning recess; 62. positioning block;

70. control assembly; 71. first circuit board; 72. first button; 73. second circuit board; 74. second button;

80. rotating resetting structure; 81. magnetic induction sensor; 82. magnet; 2000. hairdressing assembly; 300. hair curling shaft; 301. mounting block; 302. rotating block; 303. first clamping bar; 304. second clamping bar; 400. clamping cooperating member; 401. pressing portion; 402. elastic portion; 403. hair curling clamping portion; 404. clamping control portion; 4041. button rod; 4042. clamping block; 500. bristle; 600. functional member; 700. anti-scald sleeve; and L. axis of rotation.

The present application is further illustrated by the following particular embodiments in conjunction with the above accompanying drawings.

DETAILED DESCRIPTION OF THE EMBODIMENTS

The technical solutions in embodiments of the present application will be described below in conjunction with the accompanying drawings in the embodiments of the present application. Obviously, the described embodiments are only a part of embodiments of the present application, not all of them.

An embodiment of the present application provides a rotating conductive structure. The rotating conductive structure has an axis of rotation and includes an insulating member, a conductive rotating member and a conductive fixed member. The conductive rotating member includes a first rotating portion and a second rotating portion, the first rotating portion and the second rotating portion are capable of rotating around the axis of rotation, and the first rotating portion and the second rotating portion are electrically connected to a hairdressing assembly for hair styling; the conductive fixed member includes a first fixed portion and a second fixed portion, the first fixed portion is in contact with the first rotating portion, the second fixed portion is in contact with the second rotating portion, and the conductive fixed member is fixedly mounted on a body; the insulating member is configured to isolate the first rotating portion from the second rotating portion and is configured to limit the first rotating portion and the second rotating portion so as to prevent the conductive rotating member from being deformed; and a current passes through the first fixed portion, the first rotating portion, the hairdressing assembly, the second rotating portion and the second fixed portion in sequence to form a series circuit with a power source.

According to the rotating conductive structure, when a positive pole of the power source is connected to the first fixed portion and a negative pole is connected to the second fixed portion, the current passes through the first fixed portion, the first rotating portion, the hairdressing assembly, the second rotating portion and the second fixed portion in sequence to form the series circuit with the power source. The first fixed portion is in contact with the first rotating portion, and the second fixed portion is in contact with the second rotating portion, so that when the first rotating portion, the second rotating portion and the hairdressing assembly rotate synchronously, circuit connection can be maintained. In addition, the first rotating portion, the second rotating portion and the hairdressing assembly rotate synchronously, so that even if the first rotating portion and the second rotating portion are connected to the hairdressing assembly by means of electric wires, the electric wires can also be kept relatively straight. The insulating member is provided to isolate the first rotating portion from the second rotating portion, so that the short-circuit situation caused by direct contact between the first rotating portion and the second rotating portion is reduced.

The embodiment of the present application is further illustrated below in conjunction with the accompanying drawings.

Overall Description

Reference is made to FIG. 1. The embodiment of the present application provides a hairdressing device 1, the hairdressing device 1 including a handle 1000 and a hairdressing assembly 2000, where the handle 1000 is connected to the hairdressing assembly 2000, and a user can control the handle 1000 to enable the hairdressing assembly 2000 to rotate and generate heat. Hair can be wound onto the hairdressing assembly 2000 by rotation of the hairdressing assembly 2000, and the heat generated by the hairdressing assembly 2000 can be transferred to the hair, so that the hair wound on the hairdressing assembly 2000 forms a curled hairstyle. Rotation of the hairdressing assembly 2000 is controlled by means of the handle 1000, and the hairdressing assembly 2000 is not manually rotated by the user, so that the hair can be wound and fixed more conveniently.

It should be noted that the connection manner of the handle 1000 and the hairdressing assembly 2000 is not limited, for example, the handle 1000 can be fixedly connected to the hairdressing assembly 2000, and the handle 1000 and the hairdressing assembly 2000 are non-removable, which can improve the connection stability between the handle 1000 and the hairdressing assembly 2000. For another example, handle 1000 is detachably connected to the hairdressing assembly 2000, so that the user can select different types of hairdressing assemblies 2000 according to the actual requirements, so as to improve the user experience.

Handle

Figure 2:
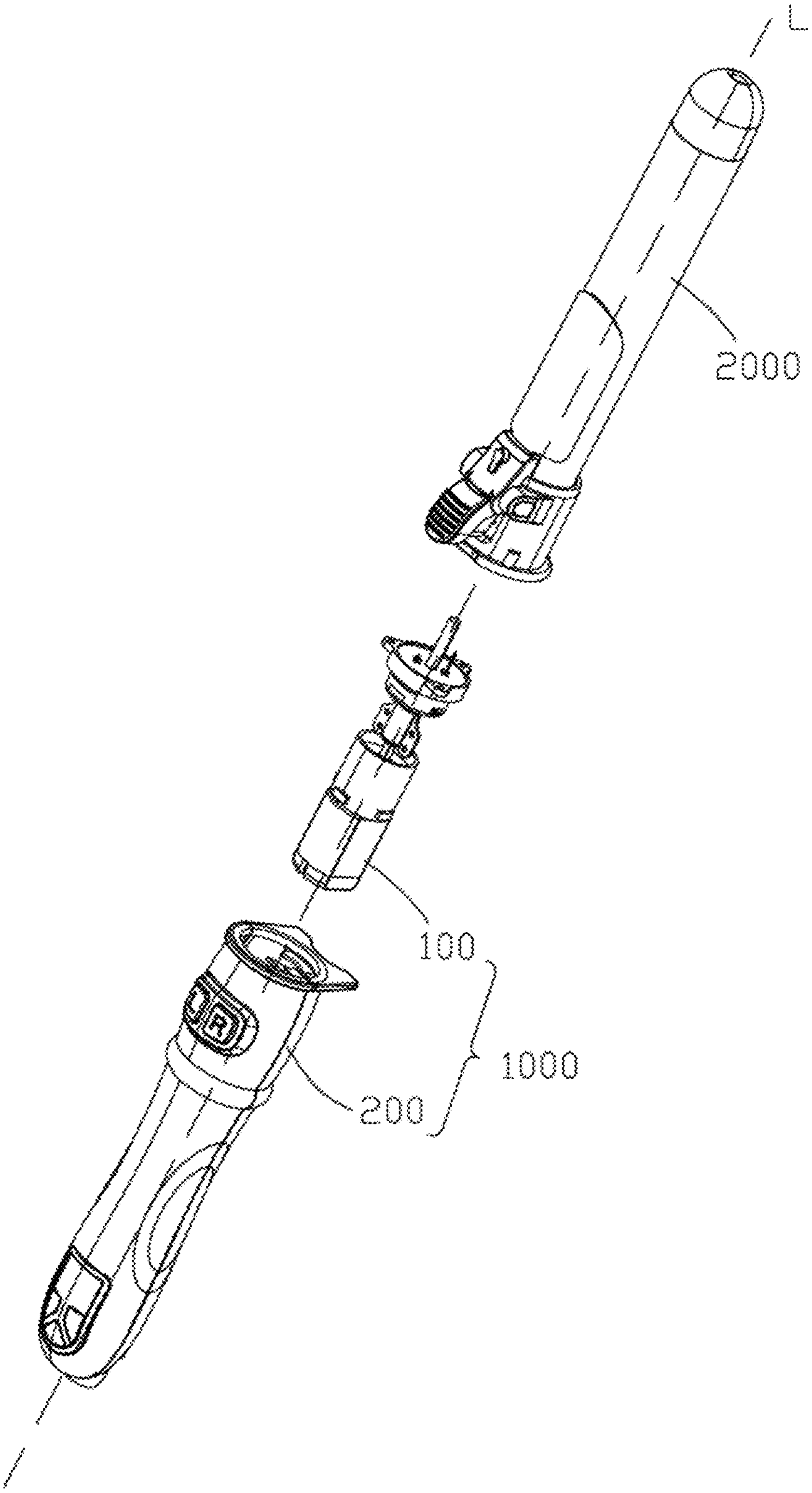
FIG. 2 is an exploded view of a hairdressing device in an embodiment of the present application.
Figure 3:
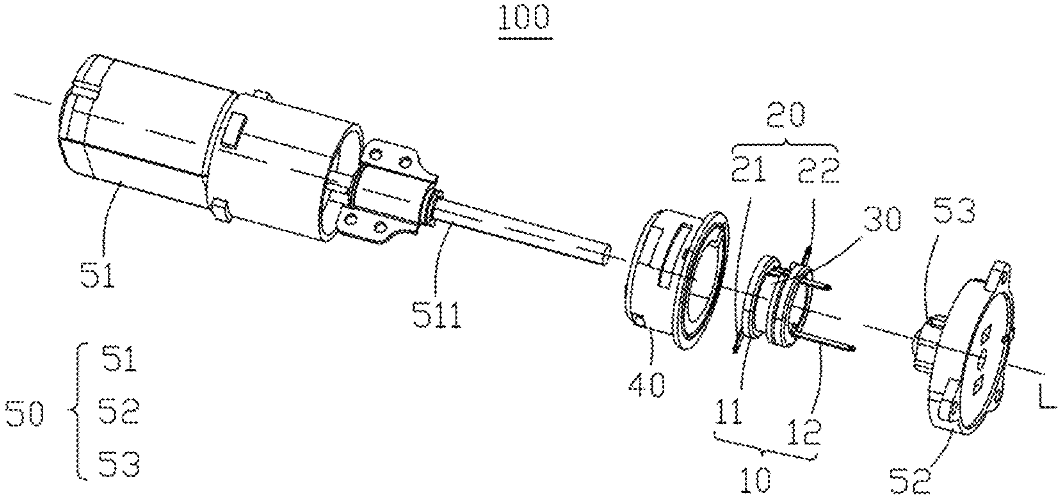
FIG. 3 is an exploded view of a rotating conductive structure in an embodiment of the present application.
Figure 4:
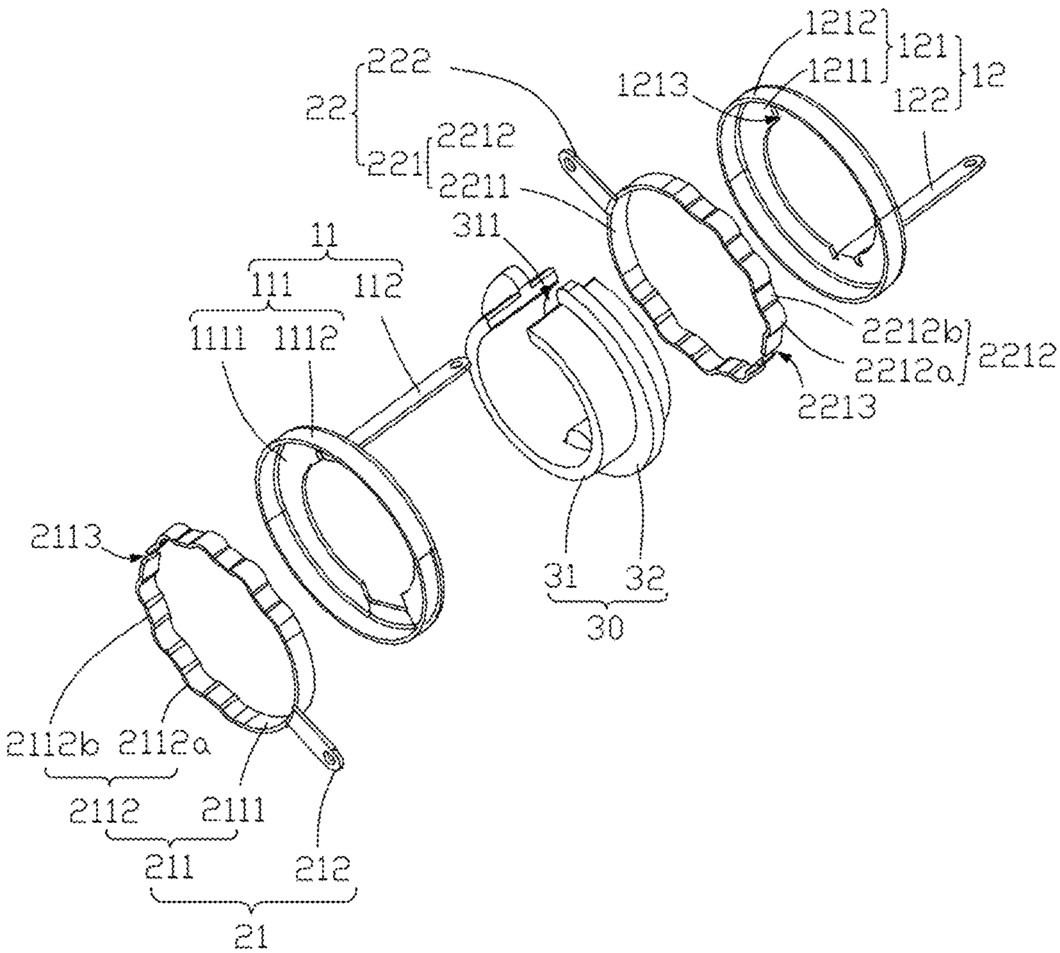
FIG. 4 is an exploded view of a conductive rotating member, a conductive fixed member and an insulating member in an embodiment of the present application.
Figure 5:
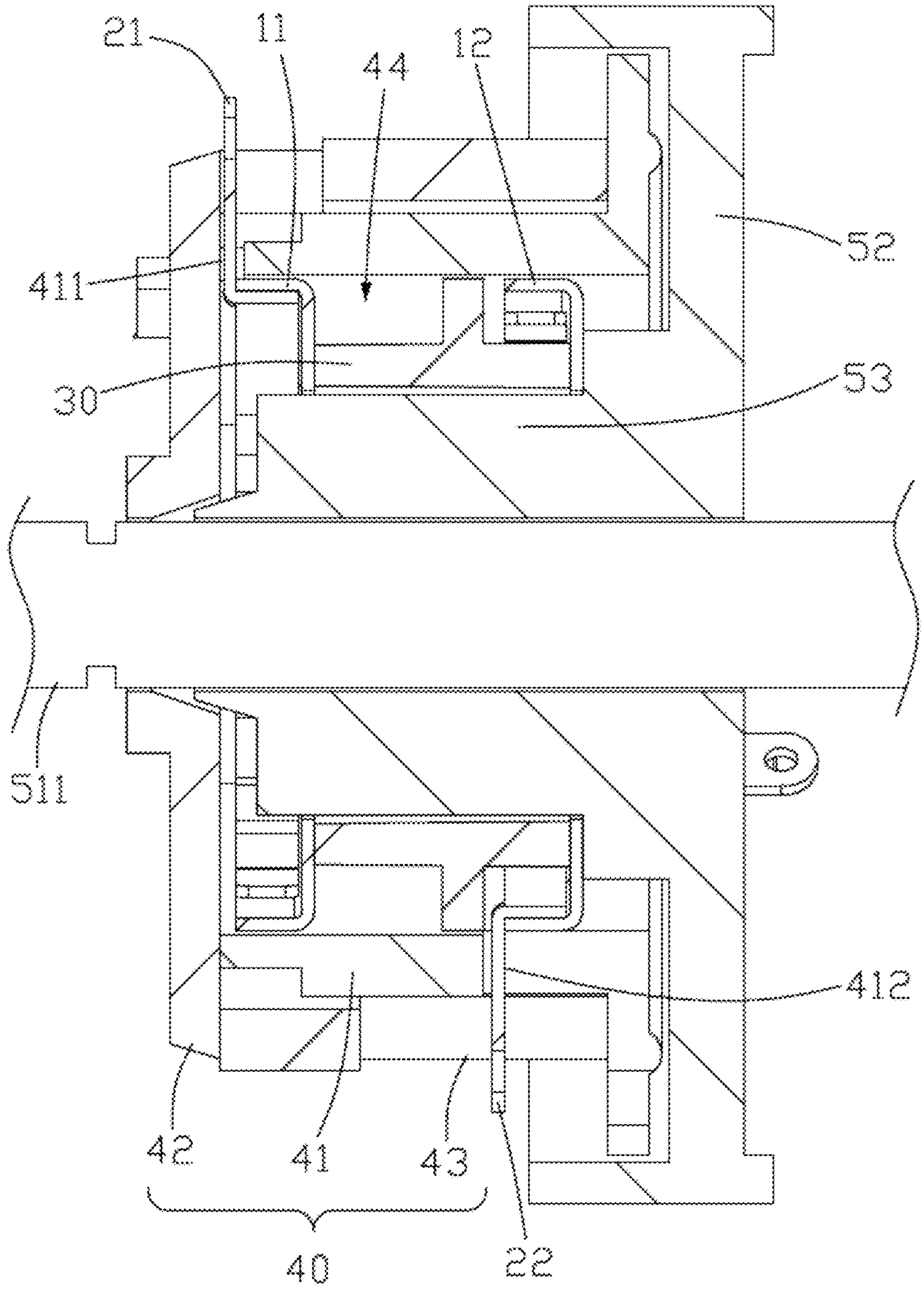
FIG. 5 is a sectional view of a part of a rotating conductive structure in an embodiment of the present application.
Figure 6:
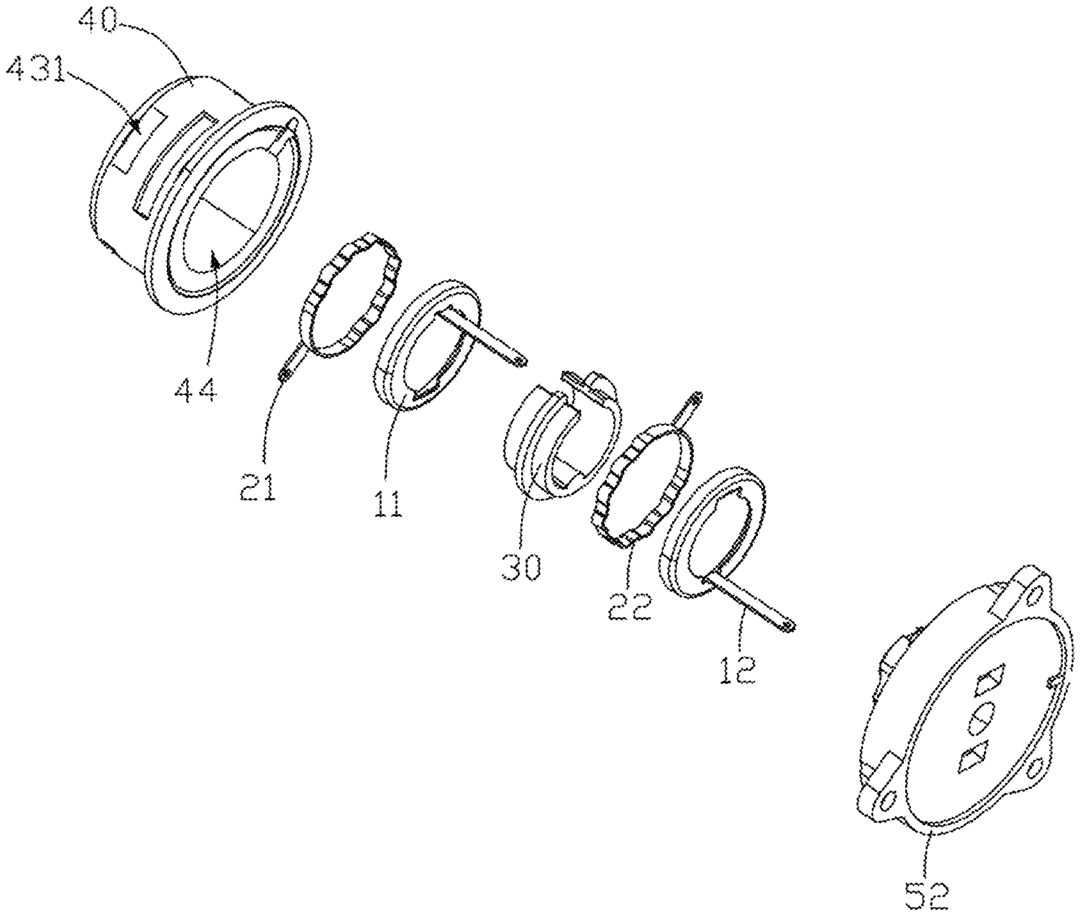
FIG. 6 is an exploded view of a part of a rotating conductive structure in an embodiment of the present application.
Figure 7:
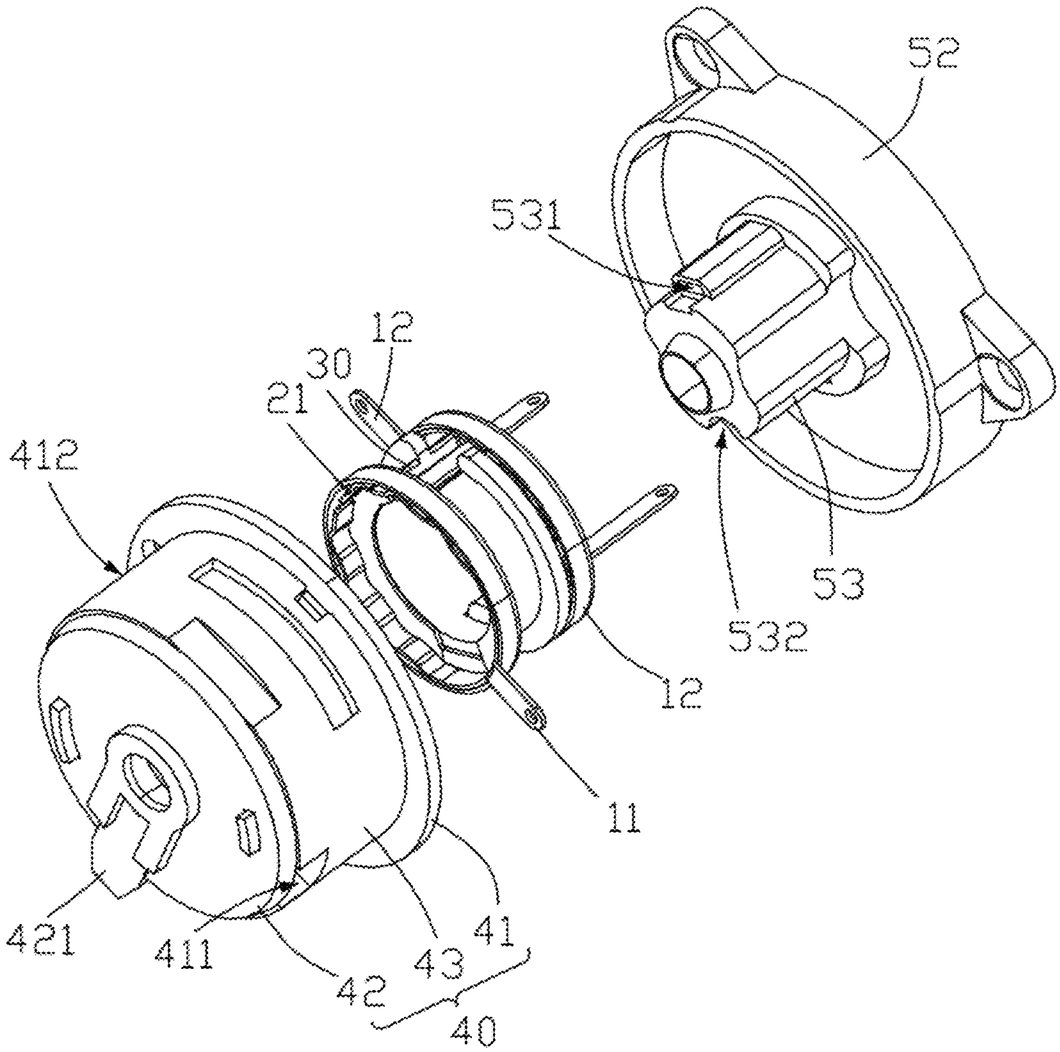
FIG. 7 is an exploded view of a part of a rotating conductive structure at another angle in an embodiment of the present application.
Figure 8:
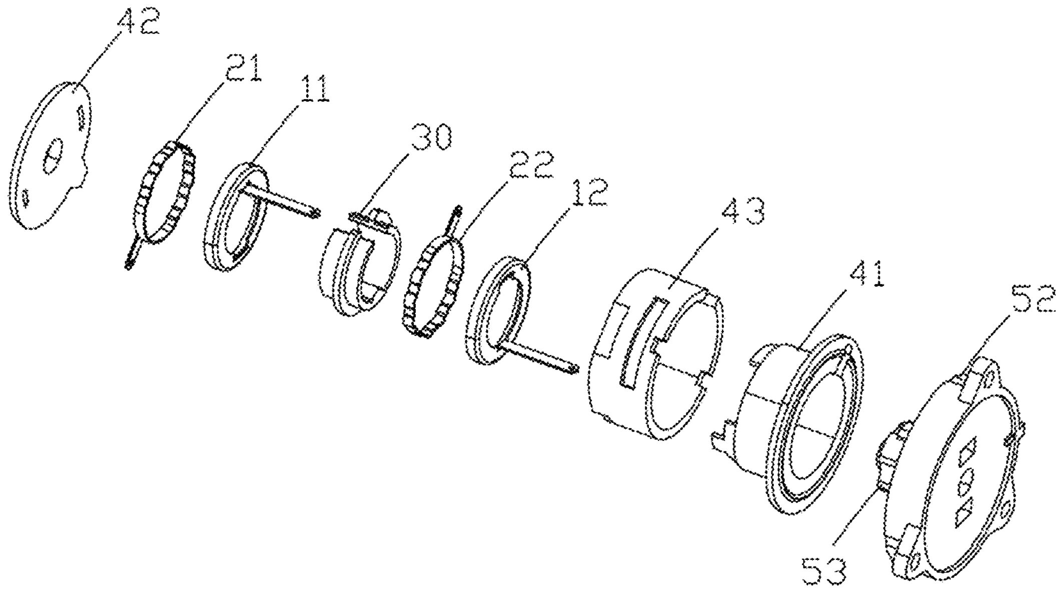
FIG. 8 is an exploded view of an insulating protective sleeve, a conductive rotating member, a conductive fixed member, an insulating member and a rotating driving portion in an embodiment of the present application.

Reference is made to FIG. 2. The handle 1000 includes a rotating conductive structure 100 and a handle body 200, where the rotating conductive structure 100 is mounted in the handle body 200, the rotating conductive structure 100 is connected to the hairdressing assembly 2000, and a current can be conducted between the rotating conductive structure 100 and the hairdressing assembly 2000.

Rotating Conductive Structure

Reference is continuously made to FIG. 3 to FIG. 8. The rotating conductive structure 100 includes a conductive rotating member 10 and a conductive fixed member 20, where the conductive rotating member 10 is in contact with the conductive fixed member 20, and the conductive rotating member 10 is connected to the hairdressing assembly 2000 and can rotate synchronously with the hairdressing assembly 2000. The conductive fixed member 20 is fixedly mounted on the handle body 200. The current can start from a power source and passes through the conductive fixed member 20, the conductive rotating member 10 and the hairdressing assembly 2000 in sequence. It should be noted that the conductive fixed member 20 being fixedly mounted on the handle body 200 includes direct mounting as well as indirect mounting.

The power source can be an external power source, and can also be a power source included by the hairdressing device 1, for example, a battery and a storage battery, and the power source is mounted in the handle body 200.

Content of Independent Claim

Specifically, the conductive rotating member 10 includes a first rotating portion 11 and a second rotating portion 12, where the first rotating portion 11 and the second rotating portion 12 are connected to the hairdressing assembly 2000. The first rotating portion 11 and the second rotating portion 12 are can rotate around an axis L of rotation, that is, the first rotating portion 11, the second rotating portion 12 and the hairdressing assembly 2000 rotate synchronously. The first rotating portion 11 and the second rotating portion 12 are connected to the hairdressing assembly 2000 by means of electric wires.

The conductive fixed member 20 includes a first fixed portion 21 and a second fixed portion 22, where the first fixed portion 21 is in contact with the first rotating portion 11, the second rotating portion 22 is in contact with the second fixed portion 12, one of the first fixed portion 21 and the second fixed portion 22 is electrically connected to a positive pole of the power source, and the other one is electrically connected to a negative pole of the power source.

When the positive pole of the power source is electrically connected to the first fixed portion 21 and the negative pole is electrically connected to the second fixed portion 22, the current passes through the first fixed portion 21, the first rotating portion 11, the hairdressing assembly 2000, the second rotating portion 12 and the second fixed portion 22 in sequence so as to form a series circuit with the power source. The first fixed portion 21 is in contact with the first rotating portion 11, and the second fixed portion 22 is in contact with the second rotating portion 12, so that when the first rotating portion 11, the second rotating portion 12 and the hairdressing assembly 2000 rotate synchronously, circuit connection can be maintained. In addition, the first rotating portion 11, the second rotating portion 12 and the hairdressing assembly 2000 rotate synchronously, so that even if the first rotating portion 11 and the second rotating portion 12 are connected to the hairdressing assembly 2000 by means of the electric wires, the electric wires can also be kept relatively straight.

The rotating conductive structure 100 further includes an insulating member 30, where the insulating member 30 is configured to isolate the first rotating portion 11 from the second rotating portion 12, and the insulating member 30 is configured to limit the first rotating portion 11 and the second rotating portion 12. The insulating member 30 is provided to isolate the first rotating portion 11 from the second rotating portion 12, so that the short-circuit situation caused by direct contact between the first rotating portion 11 and the second rotating portion 12 is reduced.

Optionally, in an extension direction of the axis L of rotation, one end of the insulating member 30 is provided with the first rotating portion 11 and the first fixed portion 21, and the other end is provided with the second rotating portion 12 and the second fixed portion 22. That is, the insulating member 30 is located between the first rotating portion 11 and the second rotating portion 12, and is also located between the first fixed portion 21 and the second fixed portion 22, thereby isolating the first rotating portion 11 from the second rotating portion 12, and isolating the first fixed portion 21 from the second fixed portion 22.

Relationship between conductive rotating member and conductive fixed member

In some embodiments, at least one of the first rotating portion 11 and the first fixed portion 21 is of an annular structure, and at least one of the second rotating portion 12 and the second fixed portion 22 is of an annular structure.

Due to the annular structures, the first rotating portion 11 can be in surface contact with the first fixed portion 21 all the time in a rotating process, and the second rotating portion 12 can be in surface contact with the second fixed portion 22 all the time in a rotating process, thereby maintaining the circuit connection.

In some embodiments, the first rotating portion 11, the first fixed portion 21, the second rotating portion 12 and the second fixed portion 22 are all of the annular structures, so that the contact area of the first rotating portion 11 and the first fixed portion 21 and the contact area of the second rotating portion 12 and the second fixed portion 22 are large, the contact stability can be improved, and the situation of separation of the first rotating portion 11 from the first fixed portion 21 or separation of the second rotating portion 12 from the second fixed portion 22 due to shaking can be reduced.

In some other embodiments, one of the first rotating portion 11 and the first fixed portion 21 is of the annular structure, and the other one is of a sheet-shaped structure; and one of the second rotating portion 12 and the second fixed portion 22 is of the annular structure, and the other one is of a sheet-shaped structure. Configuring the sheet-shaped structures can reduce the material consumption and reduce the weight.

Structure of First Rotating Portion

In some embodiments, the first rotating portion 11 includes a first rotating ring 111 and a first conductive strip 112, and an axis of the first rotating ring 111 overlaps the axis L of rotation. The first conductive strip 112 extends along the axis L of rotation and is connected to the first rotating ring 111.

The first rotating ring 111 is in contact with the first fixed portion 21, the first conductive strip 112 is connected to the hairdressing assembly 2000 by means of the electric wire, and the current passes through the first fixed portion 21, the first rotating ring 111 and the first conductive strip 112 in sequence to be transmitted to the hairdressing assembly 2000 and then is transmitted to the second rotating portion 12 and the second fixed portion 22.

First Conductive Strip

In some embodiments, the first conductive strip 112 extends in a direct close to the hairdressing assembly 2000 and penetrates through the insulating member 30 and the second rotating portion 12, thereby shortening the distance from the hairdressing assembly 2000, shortening the length of the electric wire, and reducing the situation that the electric wire is wound on the rotating conductive structure 100. It should be noted that the first conductive strip 112 is spaced apart from the second rotating portion 12, so that the first conductive strip 112 is not in contact with the second rotating portion 12, thereby preventing short-circuiting.

In some embodiments, the insulating member 30 is provided with a first avoiding groove 311, and the first avoiding groove 311 penetrates through the insulating member 30 in the extension direction of the axis L of rotation; and the second rotating portion 12 is provided with a second avoiding groove 1213, and the second avoiding groove 1213 penetrates through the second rotating portion 12 in the extension direction of the axis L of rotation. The first avoiding groove is aligned to the second avoiding groove 1213 in position. The first conductive strip 112 penetrates through the first avoiding groove 311 and the second avoiding groove 1213, so that the first conductive strip 112 can extend towards a heating assembly.

First Rotating Ring

In some embodiments, the first rotating ring 111 is connected to the first fixed portion 21 in the extension direction of the axis L of rotation, and at least a part of the first fixed portion 21 is located in the first rotating ring 111. At least a part of the first fixed portion 21 is located in the first rotating ring 111, so that the situation that the first fixed portion 21 is separated from the first rotating ring 111 due to the increase of the diameter of the first fixed portion 21 after long-time usage can be reduced.

In some embodiments, the first rotating ring 111 includes a first ring 1111 and a first stop ring 1112, and an axis of the first ring 1111 overlaps the axis L of rotation. An inner surface of the first ring 1111 is in contact with the first fixed portion 21. The first stop ring 1112 and the first ring 1111 are coaxially provided, an outer diameter of the first stop ring 1112 is connected to the first ring 1111, and an inner diameter of the first stop ring 1112 is smaller than an inner diameter of the first ring 1111. The first conductive strip 112 is connected to the first stop ring 1112. The first fixed portion 21 is located on one side of the first stop ring 1112 away from the insulating member 30, and the first stop ring 1112 is configured to block the movement of the first fixed portion 21 towards the insulating member 30.

First Fixed Portion

In some embodiments, the first fixed portion 21 includes a first fixed ring 211, and an axis of the first fixed ring 211 overlaps the axis L of rotation. At least a part of the first fixed ring 211 is embedded in the first rotating ring 111. Specifically, an outer surface of the first fixed ring 211 is in contact with an inner surface of the first ring 1111, and one side of the first fixed ring 211 close to the insulating member 30 is in contact with the first stop ring 1112.

First Fixed Ring

In some embodiments, the first fixed ring 211 is provided with a first notch 2113, and the first notch 2113 penetrates through the first fixed ring 211 in the extension direction of the axis L of rotation, so that the first fixed ring 211 can be elastically deformed and shrunk, and the first fixed ring 211 can be completely embedded in the first ring 1111 of the first rotating ring 111. The first fixed ring 211 exerts an elastic restoring force to the first ring 1111, thereby improving the contact stability between the first ring 1111 and the first fixed ring 211.

Optionally, when the first fixed ring 211 is restored from the elastic deformation, the diameter of the first fixed ring 211 is greater than the diameter of the first ring 1111, so that when the first fixed ring 211 is elastically deformed and embedded into the first rotating ring 111, the first fixed ring 211 can stably exert the elastic force to the first ring 1111.

It should be noted that the positions of the first fixed ring 211 and the first rotating ring 111 are not limited in such a manner that the first fixed ring 211 is located in the first rotating ring 111, the first rotating ring 111 can be provided with the first notch 2113, the first fixed ring 211 can be of a complete annular structure, and the first rotating ring 111 can be elastically deformed to reduce the diameter to be embedded into the first fixed ring 211. Correspondingly, when the first rotating ring 111 is located in the first fixed ring 211, after the first rotating ring 111 is restored from the elastic deformation, the diameter of the first rotating ring 111 is greater than the diameter of the first fixed ring 211.

In some embodiments, an outer circumferential surface of the first fixed ring 211 is a smooth surface so as to be in contact with an inner circumferential surface of the first ring 1111 of the first rotating portion 11.

In some embodiments, the first fixed ring 211 includes at least one first connecting section 2111 and at least one first wave section 2112, the first connecting section 2111 is connected to the first wave section 2112, an outer side of the first connecting section 2111 is in contact with the inner circumferential surface of the first ring 1111, the first wave section 2112 includes at least one first outer convex edge **2112*a*, and an outer surface of the first outer convex edge 2112*a* is configured to abut against the inner circumferential surface of the first ring 1111 of the first rotating portion 11. The first wave section 2112 further includes at least one first connecting edge 2112*b*, the first connecting edge 2112*b* is connected to the first outer convex edge 2112*a*, and the first connecting edge 2112*b* is separated from an inner surface of a first inner ring. Optionally, there are a plurality of first outer convex edges 2112*a* and a plurality of first connecting edges 2112*b* which are provided alternately, so that the first wave section 2112** is approximately in a wave shape.

Providing the first outer convex edges **2112*a* and the first connecting edges 2112*b* can reduce the contact area of the first fixed ring 211 and the first ring 1111, thereby reducing the overheating situation, prolonging the service life of the first fixed ring 211, and improving the elasticity so as to improve the contact stability of the first fixed ring 211 and the first ring 1111**.

In some embodiments, there are two first wave sections 2112 and one first connecting section 2111, each of two ends of the first connecting section 2111 is fixedly connected to one end of one of the two first wave sections 2112, and each of the first wave sections 2112 is provided with two first outer convex edges **2112*a*. Optionally, ends of the two first wave sections 2112 close to each other are not connected, so that the first notch 2113 is formed in the first fixed ring 211**.

First Connecting Strip

In some embodiments, the first fixed portion 21 further includes a first connecting strip 212 connected to the first fixed ring 211, where the first connecting strip 212 extends out of the first rotating ring 111, and an extension direction of the first connecting strip 212 is perpendicular to the extension direction of the axis L of rotation. The first connecting strip 212 is connected to the electric wire, so as to be electrically connected to the positive pole of the power source.

Second Rotating Portion

In some embodiments, the second rotating portion 12 includes a second rotating ring 121 and a second conductive strip 122, where an axis of the second rotating ring 121 overlaps the axis L of rotation, and the second avoiding groove 1213 is located in the second rotating ring 121. The second conductive strip 122 extends along the axis L of rotation and is connected to the second rotating ring 121.

The second rotating ring 121 is in contact with the second fixed portion 22, the second conductive strip 122 is connected to the hairdressing assembly 2000 by means of the electric wire, and the current passes through the second fixed portion 22, the second rotating ring 121 and the second conductive strip 122 in sequence to be transmitted to the hairdressing assembly 2000 and then is transmitted to the second rotating portion 12 and the second fixed portion 22.

Second Conductive Strip

In some embodiments, the second conductive strip 122 is located on one side away from the first rotating ring 111, and the second conductive strip 122 extends in a direct close to the hairdressing assembly 2000, thereby shortening the distance from the hairdressing assembly 2000, shortening the length of the electric wire, and reducing the situation that the electric wire is wound on the rotating conductive structure 100. The second conductive strip 122 and the first conductive strip 112 are provided opposite each other.

Second Rotating Ring

In some embodiments, the second rotating ring 121 is connected to the second fixed portion 22 in the extension direction of the axis L of rotation, and at least a part of the second fixed portion 22 is located in the second rotating ring 121. At least a part of the second fixed portion 22 is located in the second rotating ring 121, so that the situation that the second fixed portion 22 is separated from the second rotating ring 121 due to the increase of the diameter of the second fixed portion 22 after long-time usage can be reduced.

In some embodiments, the second rotating ring 121 includes a second ring 1211 and a second stop ring 1212, and an axis of the second ring 1211 overlaps the axis L of rotation. An inner surface of the second ring 1211 is in contact with the second fixed portion 22. The second stop ring 1212 and the second ring 1211 are coaxially provided, an outer diameter of the second stop ring 1212 is connected to the second ring 1211, and an inner diameter of the second stop ring 1212 is smaller than an inner diameter of the second ring 1211. The second conductive strip 122 is connected to the second stop ring 1212. The second fixed portion 22 is located on one side of the second stop ring 1212 close to the first rotating portion 11, and the second stop ring 1212 is configured to block the movement of the second fixed portion 22 towards the insulating member 30.

Second Fixed Portion

In some embodiments, the second fixed portion 22 includes a second fixed ring 221, and an axis of the second fixed ring 221 overlaps the axis L of rotation. At least a part of the second fixed ring 221 is embedded in the second rotating ring 121. Specifically, an outer surface of the second fixed ring 221 is in contact with an inner surface of the second ring 1211, and one side of the second fixed ring 221 close to the insulating member 30 is in contact with the second stop ring 1212.

Second Fixed Ring

In some embodiments, the second fixed ring 221 is provided with a second notch 2213, and the second notch 2213 penetrates through the second fixed ring 221 in the extension direction of the axis L of rotation, so that the second fixed ring 221 can be elastically deformed and reduce the diameter, and the second fixed ring 221 can be completely embedded in the second ring 1211 of the second rotating ring 121. The second fixed ring 221 exerts an elastic restoring force to the second ring 1211, thereby improving the contact stability between the second ring 1211 and the second fixed ring 221.

Optionally, when the second fixed ring 221 is restored from the elastic deformation, the diameter of the second fixed ring 221 is greater than the diameter of the second ring 1211, so that when the second fixed ring 221 is elastically deformed and embedded into the second rotating ring 121, the second fixed ring 221 can stably exert the elastic force to the second ring 1211.

It should be noted that the positions of the second fixed ring 221 and the second rotating ring 121 are not limited in such a manner that the second fixed ring 221 is located in the second rotating ring 121, the second rotating ring 121 can be provided with the second notch 2213, the second fixed ring 221 can be of a complete annular structure, and the second rotating ring 121 can be elastically deformed to reduce the diameter to be embedded into the second fixed ring 221. Correspondingly, after the second rotating ring 121 is restored from the elastic deformation, the diameter of the second rotating ring 121 is greater than the diameter of the second fixed ring 221.

In some embodiments, an outer circumferential surface of the second fixed ring 221 is a smooth surface so as to be in contact with an inner circumferential surface of the second ring 1211 of the second rotating portion 12.

In some embodiments, the second fixed ring 221 includes at least one second connecting section 2211 and at least one second wave section 2212, the second connecting section 2211 is connected to the second wave section 2212, an outer side of the second connecting section 2211 is in contact with the inner circumferential surface of the second ring 1211, the second wave section 2212 includes at least two second outer convex edge **2212*a*, and an outer surface of the second outer convex edge 2212*a* is configured to abut against the inner circumferential surface of the second ring 1211 of the second rotating portion 12. The second wave section 2212** further includes at least one second connecting edge 2212*b*, the second connecting edge 2212*b* is connected to the second outer convex edge 2212*a*, and the second connecting edge 2212*b* is separated from an inner surface of a second inner ring. Optionally, there are a plurality of second outer convex edges 2212*a* and a plurality of second connecting edges 2212*b* which are provided alternately, so that the second wave section 2212 is approximately in a wave shape.

Providing the second outer convex edges 2212*a* and the second connecting edges 2212*b* can reduce the contact area of the second fixed ring 221 and the second ring 1211, thereby reducing the overheating situation, and improving the elasticity so as to improve the contact stability of the second fixed ring 221 and the second ring 1211.

In some embodiments, there are two second wave sections 2212 and one second connecting section 2211, each of two ends of the second connecting section 2211 is fixedly connected to one end of one of the two second wave sections 2212, and each of the second wave sections 2212 is provided with two second outer convex edges 2212*a*. Optionally, ends of the two second wave sections 2212 close to each other are not connected, so that the second notch 2213 is formed in the second fixed ring 221.

Second Connecting Strip

In some embodiments, the second fixed portion 22 further includes a second connecting strip 222 connected to the second fixed ring 221, where the second connecting strip 222 extends out of the second rotating ring 121, and an extension direction of the second connecting strip 222 is perpendicular to the extension direction of the axis L of rotation. The second connecting strip 222 is connected to the electric wire, so as to be electrically connected to the negative pole of the power source.

Stage Summary

When the hairdressing device 1 operates, the current flows out of the positive pole of the power source, passes through the first connecting strip 212, the first fixed ring 211, the first rotating ring 111 and the first conductive strip 112 in sequence to be transmitted to the hairdressing assembly 2000, and then flows back to pass through the second conductive strip 122, the second rotating ring 121, the second fixed ring 221 and the second connecting strip 222 in sequence to return to the negative pole of the power source, thereby forming the series circuit.

Insulating Member

The first rotating ring 111 is isolated from the second rotating ring 121 by means of the insulating member 30, so that the short-circuit situation caused by the contact between the first rotating portion 111 and the second rotating portion 121 is reduced. It should be noted that the first fixed ring 211 is located in the first rotating ring 111, and the second fixed ring 221 is located in the second rotating ring 121, so that when the first rotating ring 111 is isolated from the second rotating ring 121, the first fixed ring 211 cannot be in contact with the second fixed ring 221 or the second rotating ring 121, and correspondingly, the second fixed ring 221 cannot be in contact with the first rotating ring 111.

Specifically, in the extension direction of the axis of rotation, one end of the insulating member 30 is in contact with the first stop ring 1112, and the other end is in contact with the second stop ring 1212, thereby isolating the first rotating ring 111 from the second rotating ring 121. The second fixed ring 221 is sleeved on the insulating member 30, so that the overall length of the rotating conductive structure 100 can be shortened, which is beneficial to the light weight.

In some embodiments, the insulating member 30 includes an insulating ring 31, and an axis of the insulating ring 31 overlaps the axis L of rotation. The insulating ring 31 is made of an insulating material. One end of the insulating ring 31 is in contact with the first stop ring 1112, and the other end is in contact with the second stop ring 1212, so that the insulating ring 31 is located between the first rotating portion 11 and the second rotating portion 12 and is configured to control a spacing distance between the first rotating ring 11 and the second rotating ring 12.

In some embodiments, the insulating member 30 further includes a blocking convex edge 32 provided on an outer circumferential surface of the insulating ring 31, and the blocking convex edge 32 is configured to prevent the second fixed portion 22 from being separated from the second rotating portion 12 when the second rotating portion 12 rotates. Specifically, the second fixed portion 22 is located between the blocking convex edge 32 and the second stop ring 1212, thereby limiting the position of the second fixed portion 22 in the extension direction of the axis L of rotation; and the second fixed ring 221 of the second fixed portion 22 is located in the second ring 1211, thereby limiting the position of the second fixed portion 22 perpendicular to the extension direction of the axis L of rotation, and then maintaining the stable position of the second fixed portion 22.

Insulating Protective Sleeve

In some embodiments, the rotating conductive structure 100 further includes an insulating protective sleeve 40, where the insulating protective sleeve 40 is provided with a limiting rotating cavity 44, and the conductive rotating member 10 is rotatably connected to the limiting rotating cavity 44, thereby limiting the insulating member 30, the conductive rotating member 10 and the conductive fixed member 20 from deviating in the rotation process. In addition, the insulating protective sleeve 40 can also prevent the conductive fixed member 20 from rotating, so that the conductive fixed member 20 is fixed relative to the handle body 200, and the conductive rotating member 10 and the hairdressing assembly 2000 rotate synchronously.

The insulating protective sleeve 40 is fixedly connected to the handle body 200, so that the conductive fixed member 20 is indirectly fixedly mounted on the handle body 200 by means of the insulating protective sleeve 40.

In some embodiments, the insulating protective sleeve 40 is provided with a first clamping groove 411 and a second clamping groove 412, the first clamping groove 411 and the second clamping groove 412 are in communication with the limiting rotating cavity 44, the first connecting strip 212 penetrates through the first clamping groove 411 such that one end of the first connecting strip 212 away from the first fixed ring 211 extends out of the insulating protective sleeve 40, and the second connecting strip 222 penetrates through the second clamping groove 412 such that one end of the second connecting strip 222 away from the second fixed ring 221 extends out of the insulating protective sleeve 40. Therefore, when the first rotating portion 11 and the second rotating portion 12 rotate, the first clamping groove 411 prevents the first fixed portion 21 from rotating, the second clamping groove 412 prevents the second fixed portion 22 from rotating, and the first fixed portion 21 and the second fixed portion 22 can be maintained stable.

In some embodiments, the insulating protective sleeve 40 is provided with a positioning convex block 421, and the handle body 200 is correspondingly provided with a positioning recess 61; and the positioning convex block 421 is located in the positioning recess 61 and is configured to limit the defined positions of the insulating protective sleeve 40 and the handle body 200, so that the rotating conductive structure 100 can be kept fixed relative to the handle body 200.

In some embodiments, an outer surface of the insulating protective sleeve 40 is provided with a positioning groove 431, the handle body 200 is correspondingly provided with a positioning block 62, and the positioning block 62 is located in the positioning groove 431 so as to limit the defined positions of the insulating protective sleeve 40 and the handle body 200, so that the rotating conductive structure 100 can be kept fixed relative to the handle body 200.

Insulating Front Shell, Insulating Rear Shell and Insulating Sleeve Shell

In some embodiments, the insulating protective sleeve 40 includes an insulating front shell 41, an insulating rear shell 42 and an insulating sleeve shell 43, where the insulating rear shell 42 is detachably connected to one end of the insulating front shell 41, and the limiting rotating cavity 44 is located in the insulating front shell 41 and is configured to accommodate the first rotating portion 11, the second rotating portion 12, the first fixed portion 21, the second fixed portion 22 and the insulating ring 31 of the insulating member 30. The insulating sleeve shell 43 is sleeved on the insulating front shell 41.

The insulating rear shell 42 is detachably connected to one end of the insulating front shell 41 and is configured to limit the first rotating portion 11, the second rotating portion 12, the first fixed portion 21, the second fixed portion 22 and the insulating ring 31 to the limiting rotating cavity 44.

The insulating protective sleeve 40 is sleeved on the insulating front shell 41 so as to limit the insulating front shell 41 to prevent the conductive rotating member 10 from being deformed due to movement.

The first rotating portion 11 is located between the insulating rear shell 42 and the insulating member 30, thereby reducing the movement of the first rotating portion 11 in the rotating process.

The positioning convex block 421 is connected to the insulating rear shell 42 and extends in the direction perpendicular to the axis L of rotation. The positioning groove 431 is located on an outer surface of the insulating sleeve shell 43, and the first clamping groove 411 and the second clamping groove 412 are located on the insulating front shell 41. The conductive rotating member 10 is rotatably connected to the insulating front shell 41.

In some embodiments, the insulating sleeve shell 43 and the insulating front shell 41 are limited by means of fitted clamping blocks and grooves, and the insulating front shell 41 and the insulating rear shell 42 are limited by means of fitted clamping blocks and grooves, so that structures of the insulating protective sleeve 40 are fixed.

Rotating Driving Portion

In some embodiments, the rotating conductive structure 100 further includes a rotating driving portion 50, where the rotating driving portion 50 is provided on the handle body 200, is connected to the conductive rotating member 10 and the hairdressing assembly 2000, and is configured to drive the conductive rotating member 10 and the hairdressing assembly 2000 to rotate.

The conductive rotating member 10 and the hairdressing assembly 2000 can be driven by the rotating driving portion 50 to rotate synchronously, thereby reducing the situation of winding of the electric wires between the conductive rotating member 10 and the hairdressing assembly 2000.

In some embodiments, the rotating driving portion 50 includes a driving source 51, a connecting shell 52 and a rotating shaft 53, where the driving source 51 is mounted on the handle body 200 and is configured to provide power. The connecting shell 52 is connected to the hairdressing assembly 2000, an axis of the rotating shaft 53 overlaps the axis L of rotation, and the rotating shaft 53 is fixedly mounted on one side of the connecting shell 52.

An output shaft 511 of the driving source 51 is fixedly connected to the connecting shell 52 and/or the rotating shaft 53, and the rotating shaft 53 is configured to limit the insulating member 30, the first rotating portion 11 and the second rotating portion 12 so as to drive the insulating ring 31, the first rotating portion 11 and the second rotating portion 12 to rotate synchronously when the driving source 51 drives the connecting shell 52 and/or the rotating shaft 53 to rotate.

Optionally, the output shaft 511 of the driving source 51 penetrates through the rotating shaft 53 and is fixedly connected to the rotating shaft 53. The rotating shaft 53 penetrates through the insulating member 30, the first rotating portion 11, the second rotating portion 12, the first fixed portion 21 and the second fixed portion 22, and cooperates with the insulating member 30, the first rotating portion 11 and the second rotating portion 12 to rotate synchronously. Optionally, the driving source 51 is an electric motor.

In some embodiments, the rotating shaft 53 is provided with a first communication groove 531 and a second communication groove 532, the first communication groove 531 and the second communication groove 532 penetrate through the rotating driving portion 50 along the axis L of rotation, the first conductive strip 112 penetrates through the first communication groove 531, and the second conductive strip 122 penetrates through the second communication groove 532. Therefore, when rotating, the rotating driving portion 50 can drive the first rotating portion 11 and the second rotating portion 12 to rotate. The rotating shaft 53 penetrates through the first rotating portion 11 and the second rotating portion 12, and the first communication groove 531 and the second communication groove 532 cooperate to drive the first rotating portion 11 and the second rotating portion 12 to rotate, so that the rotation stability is high.

In some embodiments, the rotating shaft 53 includes two protrusions provided opposite each other, the first communication groove 531 is located at one protrusion, and the second communication groove 532 is located at the other protrusion. The protrusion provided with the first communication groove 531 penetrates through a groove fitted with the second rotating portion 12, thereby driving the rotating shaft 53 and the second rotating portion 12 to rotate synchronously.

In some embodiments, a part of the rotating shaft 53 is located on one side of the second rotating portion 12, and the blocking convex edge 32 is located on the other side of the second rotating portion 12, thereby limiting the position of the second rotating portion 12, and reducing the situation of movement of the second rotating portion 12.

In some embodiments, the insulating rear shell 42 drives the insulating rear shell 42 to abut against one side of the connecting shell 52 facing away from the hairdressing assembly 2000, and the insulating front shell 41 is in surface contact with the connecting shell 52 by means of at least a part of an abutting surface so as to reduce friction between the insulating front shell 41 and the connecting shell 52.

Specifically, the insulating front shell 41 is in surface contact with the connecting shell 52 by means of a circular annular structure, the circular annular structure is, for example, an annular strip with a semi-circular cross section, and in such manner, the friction between the insulating front shell 41 and the connecting shell 52 is reduced while the contact between the insulating front shell 41 and the connecting shell 52 is ensured.

Handle Body

Figure 9:
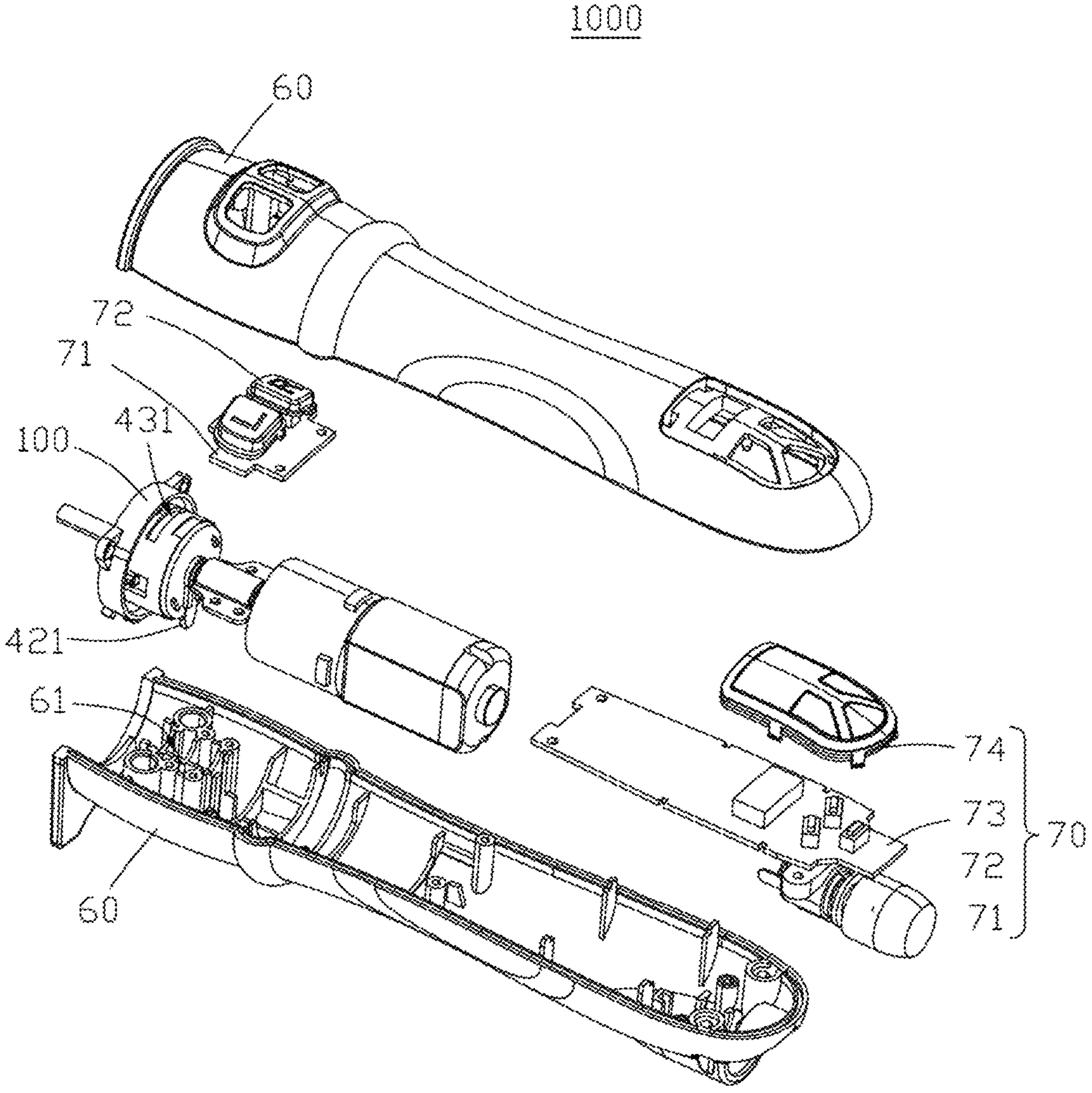
FIG. 9 is an exploded view of a handle in an embodiment of the present application.
Figure 10:
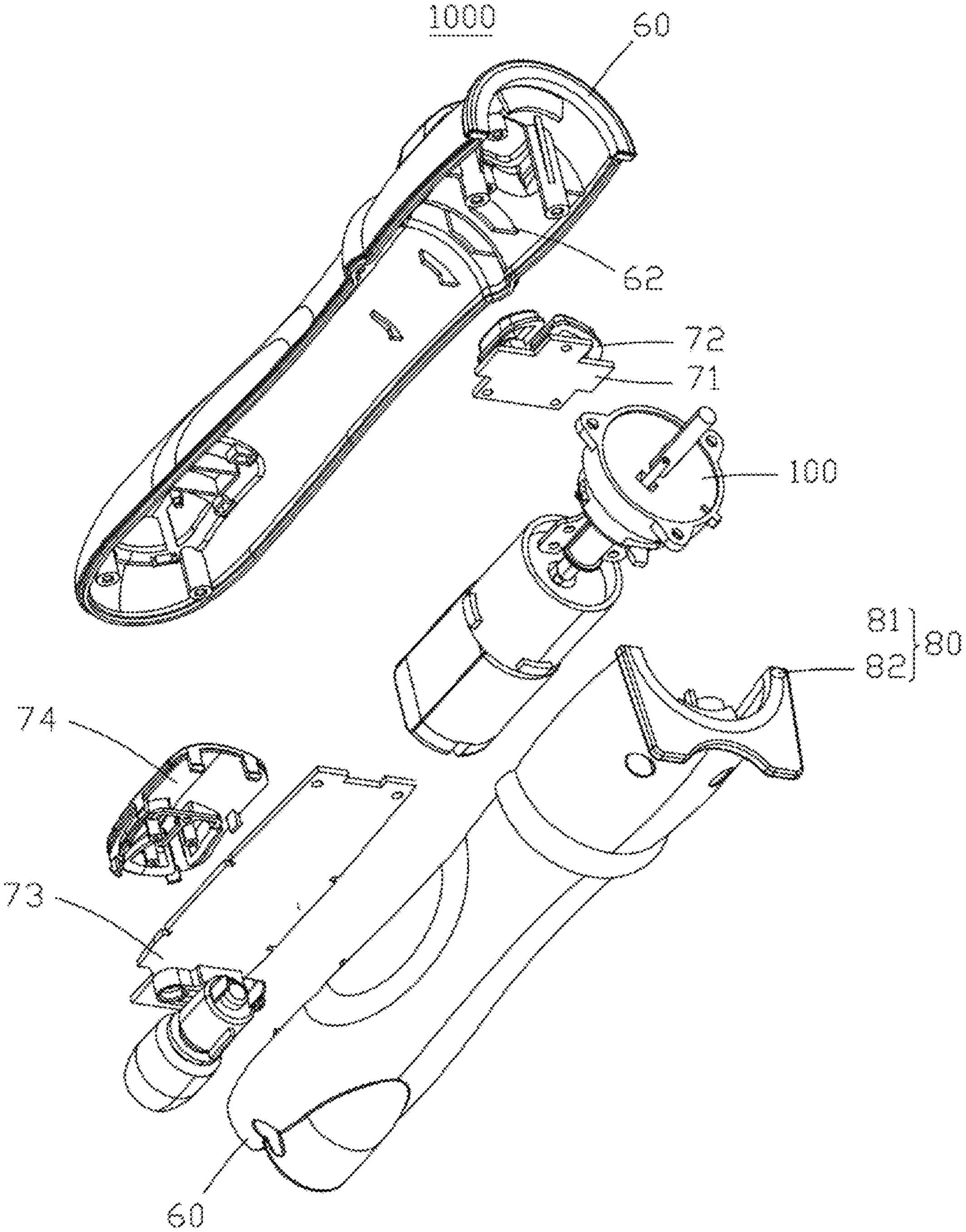
FIG. 10 is an exploded view of a handle at another angle in an embodiment of the present application.

Reference is made to FIG. 9 and FIG. 10, the handle body 200 can provide a mounting space for the rotating conductive structure 100, and the handle body 200 can also control rotation and electrifying of the rotating conductive structure 100.

The handle body 200 includes an outer shell 60 and a control assembly 70, where the control assembly 70 and the rotating conductive structure 100 are located in the outer shell 60, and the control assembly 70 is configured to control rotation of the rotating driving portion 50 and control the power source to output the current.

The outer shell 60 is formed by fitting a first shell and a second shell, and the positioning recess 61 and the positioning block 62 fitted with the insulating protective sleeve 40 are located on the outer shell 60.

The control assembly 70 includes a first circuit board 71, a first button 72, a second circuit board 73 and a second button 74, where the first circuit board 71 and the second circuit board 73 are located in the outer shell 60, and the first circuit board 71 is connected to the rotating driving portion 50 and is configured to control the rotation of the driving source 51. The first button 72 is connected to the outer shell 60, the first button 72 is exposed out of the outer shell 60 and is configured to be pressed by the user, the first button 72 is connected to the first circuit board 71, and the user presses the first button 72 to control the rotating driving portion 50 to be turned forwards or reversely.

The second circuit board 73 is configured to control the conduction of the current, thereby controlling starting and stopping of the hairdressing assembly 2000. Optionally, the second circuit board 73 can also control the power and mode of the hairdressing assembly 2000.

The second button 74 is connected to the outer shell 60, the second button 74 is exposed out of the outer shell 60 and is configured to be pressed by the user, the second button 74 is connected to the second circuit board 73, and the user presses the second button 74 to control the hairdressing assembly 2000.

The first button 72 can be controlled to enable the current to pass through the hairdressing assembly 2000 to enable the hairdressing assembly 2000 to operate, and the rotating driving portion 50 can drive the hairdressing assembly 2000 to rotate and then wind the hair, thereby facilitating hairstyling.

Figure 11:
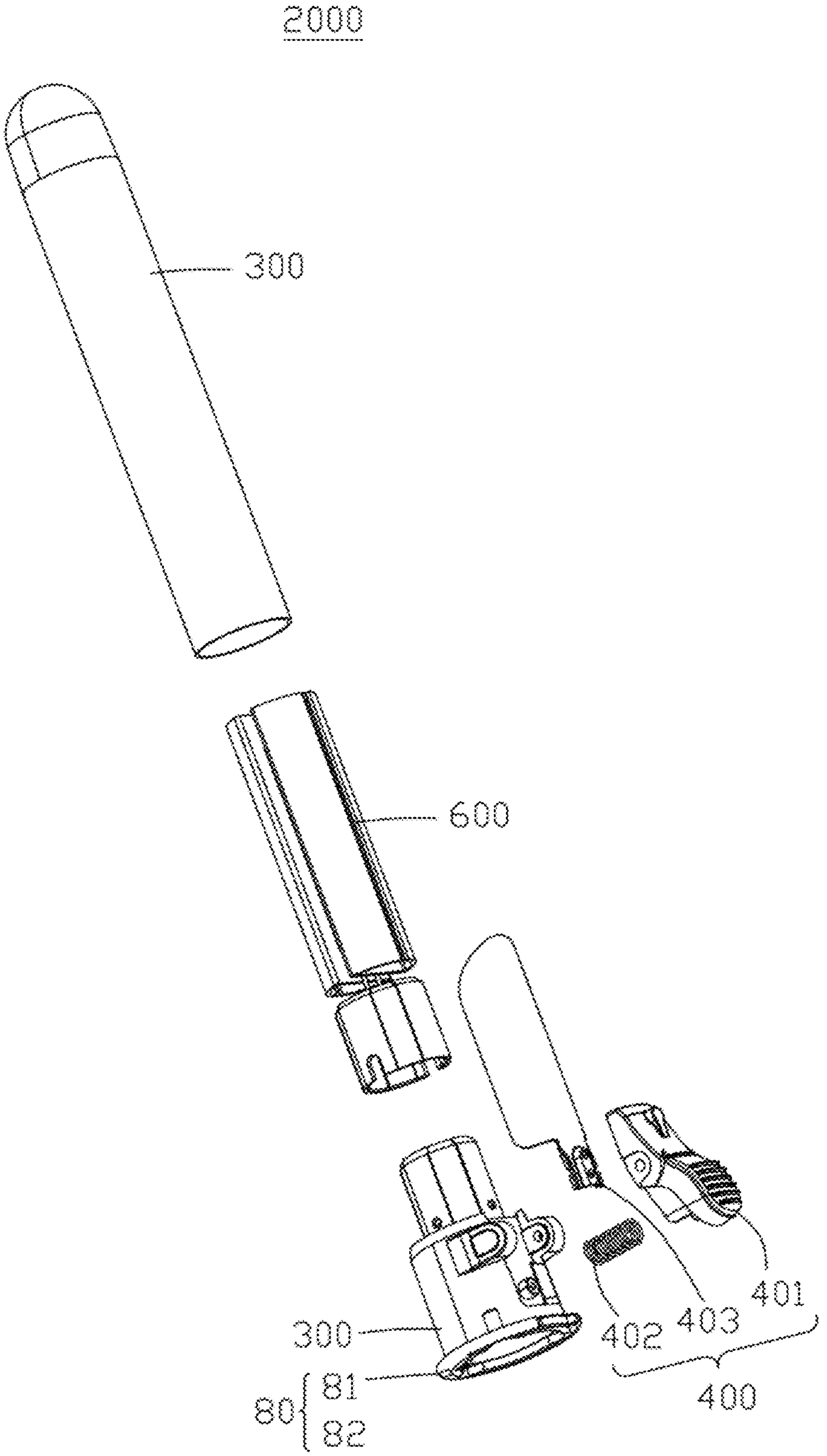
FIG. 11 is an exploded view of a hairdressing assembly in an embodiment of the present application.

Reference is made to FIG. 10 and FIG. 11. In some embodiments, the handle 1000 is provided with a rotating resetting structure 80 configured to achieve automatic resetting after the hairdressing assembly 2000 rotates a preset number of turns. By means of the rotating resetting structure 80, the hairdressing assembly 2000 is reversed and reset automatically after rotating the preset number of turns, so that the situation that the hairdressing assembly 2000 rotates many turns in one direction due to the habit or mis-operation of the user can be reduced. In some embodiments, the rotating resetting structure 80 includes a magnetic induction sensor 81 and a magnet 82, where the magnetic induction sensor 81 is embedded in one end of the handle body 200 facing the hairdressing assembly 2000 and is electrically connected to the first circuit board 71, and the magnet 82 is embedded in one end of the hairdressing assembly 2000 facing the handle body 200. In addition, in an initial position, the position of the magnet 82 directly faces the position of the magnetic induction sensor 81, and the position of the magnet 82 and the position of the magnetic induction sensor 81 deviate from the axis L of rotation, so that when the magnet 82 rotates, the magnet 82 and the magnetic induction sensor 81 can deviate from each other.

When the hairdressing assembly 2000 rotates in one direction, the magnet 82 rotates with the hairdressing assembly 2000 so as to deviate from the position directly facing the magnetic induction sensor 81; when the magnet 82 rotates one turn with the hairdressing assembly 2000, the magnetic induction sensor 81 counts 1; in the actual operation process, the preset number of turns is 3, that is, when the magnetic induction sensor 81 counts 3, the first circuit board 71 controls the hairdressing assembly 2000 to rotate in an opposite direction, that is, the hairdressing assembly 2000 is reset. It should be noted that the preset number of turns is not defined, and may also be 1, 2, 4, 5, etc.

Hairdressing Assembly

Reference is made to FIG. 11. The hairdressing assembly 2000 includes a hair curling shaft 300, where an axis of the hair curling shaft 300 overlaps the axis L of rotation. The hair curling shaft 300 is connected to the rotating driving portion 50 of the rotating conductive structure 100, so that the hair curling shaft 300 and the conductive rotating member 10 rotate synchronously. In some embodiments, the hairdressing assembly 2000 further includes a clamping cooperating member 400, where the clamping cooperating member 400 is connected to the hair curling shaft 300 and cooperates with the hair curling shaft 300 to clamp the hair. After clamping the hair, the hair curling shaft 300 can rotate to wind the hair on the hair curling shaft 300, so that the hair can be wound on the hair curling shaft 300 more conveniently and quickly. In some embodiments, the clamping cooperating member 400 includes a pressing portion, 401, an elastic portion 402 and a hair curling clamping portion 403, where the pressing portion 401 is rotatably connected to the hair curling shaft 300; one end of the elastic portion 402 is in contact with the hair curling shaft 300, the other end is in contact with the pressing portion 401, and the elastic portion 402 is located on one side of a rotation point of the pressing portion 401; the hair curling clamping portion 403 is connected to the pressing portion 401 and is located on the other side of the rotation point of the pressing portion 401; and the shape of the hair curling clamping portion 403 is fitted with the shape of the hair curling shaft 300, so that the hair curling clamping portion 403 is attached to the hair curling shaft 300.

The pressing portion 401 can be pressed down to separate the hair curling clamping portion 403 from the hair curling shaft 300, then the hair is placed between the hair curling shaft 300 and the hair curling clamping portion 403, and after the pressing portion 401 is loosened, under the action of the elastic portion 402, the hair curling clamping portion 403 and the hair curling shaft 300 can clamp the hair. Optionally, the elastic portion 402 is a spring.

In some embodiments, the hair curling shaft 300 includes a mounting block 301, a rotating block 302, a first clamping bar 303 and a second clamping bar 304, where the mounting block 301 is connected to the connecting shell 53 of the rotating driving portion 50, and the output shaft 511 of the driving source 51 extends into the mounting block 301. The rotating block 302 is rotatably connected to the mounting block 301. The first clamping bar 303 and the second clamping bar 304 are provided opposite each other, the first clamping bar 303 is fixedly connected to the rotating block 302, and the second clamping bar 304 is fixedly connected to the mounting block 301. The first clamping bar 303 and the second clamping bar 304 can clamp the hair, thereby straightening the hair or curling the hair. The hair curling clamping portion 403 is attached to the first clamping bar 303 or can rotate relative to the first clamping bar 303, so that the hair is clamped between the clamping cooperating member 400 and the first clamping bar 303.

In some embodiments, the clamping cooperating member 400 can also control the first clamping bar 303 to rotate relative to the second clamping bar 304.

Specifically, the clamping cooperating member 400 further includes a clamping control portion 404, where the clamping control portion 404 includes a button rod 4041 and a clamping block 4042, and the clamping block 4042 is fixedly connected to a lower end of the button rod 4041; the rotating block 302 is provided with an inverted T-shaped sliding groove, and the clamping block 4042 extends into the inverted T-shaped sliding groove; when the button rod 4041 rotates to a first preset angle, the clamping block 4042 is snap-fitted with the inverted T-shaped sliding groove, then the first clamping bar 303 and the hair curling clamping portion 403 maintain the same action, that is, pressing the pressing portion 401, and the first clamping bar 303 and the hair curling clamping portion 403 are opened together, so that the hair can be placed in the first clamping bar 303 and the second clamping bar 304 to be straightened; similarly, when the button rod 4041 rotates to a second preset angle, for example, 90 degrees, the clamping block 4042 is not snap-fitted with the inverted T-shaped sliding groove, then the pressing portion 401 is pressed, the hair curling clamping portion 403 is opened, the first clamping bar 303 and the second clamping bar 304 maintain in a closed state, and the hair is placed in an opening space between the hair curling clamping portion 403 and the first clamping bar 303 to be curled.

In some embodiments, the diameter of the hair curling shaft 300 may be designed to be in a range of 8-30 mm, for example, preferably 9 mm, 19 mm and 25 mm; and setting the diameters of the hair curling shafts 300 in different diameters can adapt to different requirements.

In some embodiments, the hairdressing assembly 2000 further includes a functional member 600, where the functional member 600 is provided in the hair curling shaft 300, and the functional member 600 is connected to the conductive rotating member 10 by means of the electric wire. Specifically, one end of the functional member 600 is connected to the first conductive strip 112, and the other end is connected to the second conductive strip 122.

The current passes through the first fixed portion 21, the first rotating portion 11, the functional member 600, the second rotating portion 12 and the second fixed portion 22 in sequence.

In some embodiments, the functional member 600 is an electric heating wire for heating the hair.

In some embodiments, the functional member 600 can blow an air flow, and a direction of the blown air flow is tangential with the hair curling shaft 300.

In some embodiments, the functional member 600 can generate anions for hair care.

Figure 12:
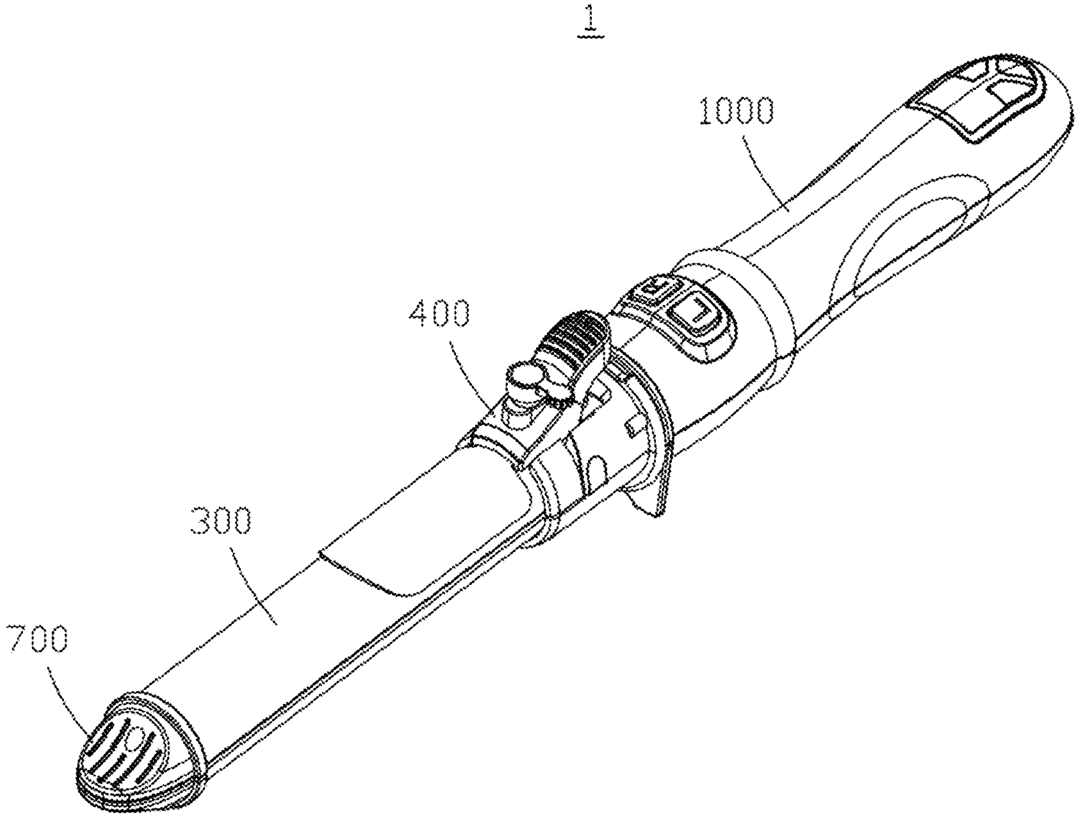
FIG. 12 is a three-dimensional structural diagram of a hairdressing device in another embodiment of the present application.

Reference is made to FIG. 12. In some embodiments, the hairdressing assembly 2000 further includes an anti-scald sleeve 700, where the anti-scald sleeve 700 is provided at one end of the hair curling shaft 300 away from the handle 1000.

Figure 13:
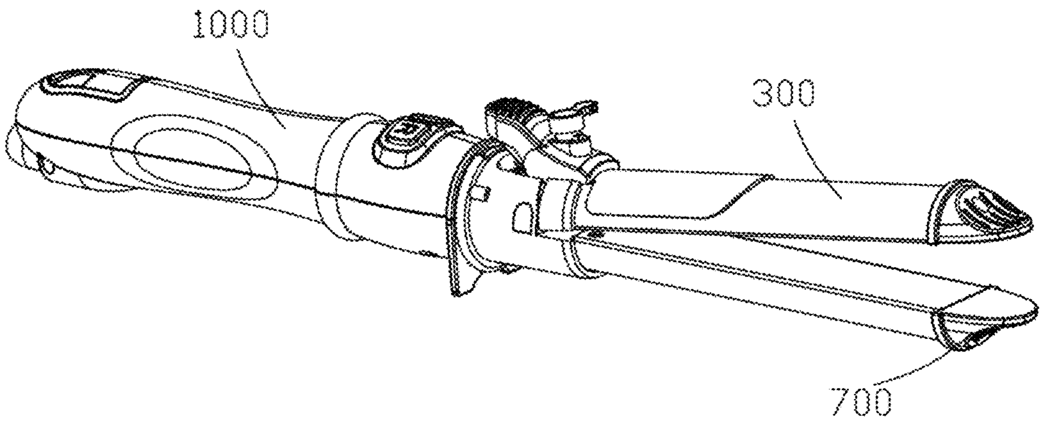
FIG. 13 and FIG. 14 are three-dimensional structural diagrams of the hairdressing device in FIG. 12 in different states.
Figure 14:
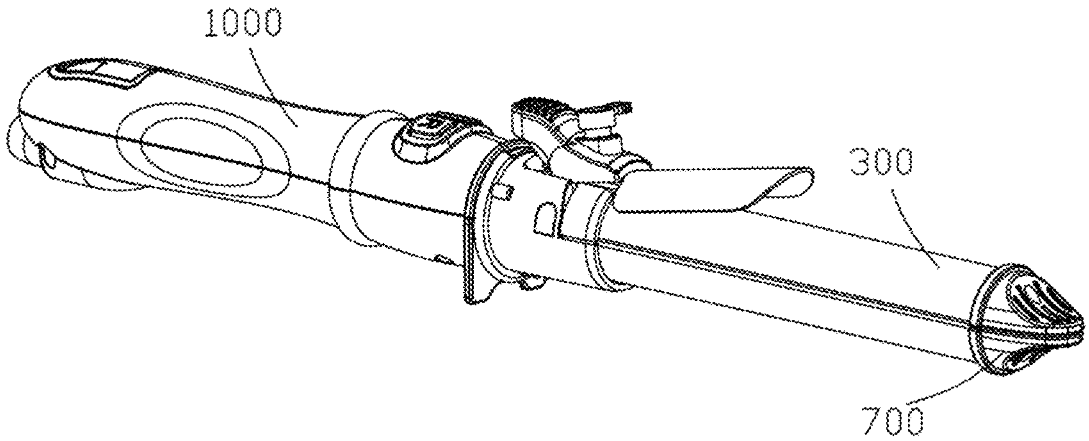
Figure 15:
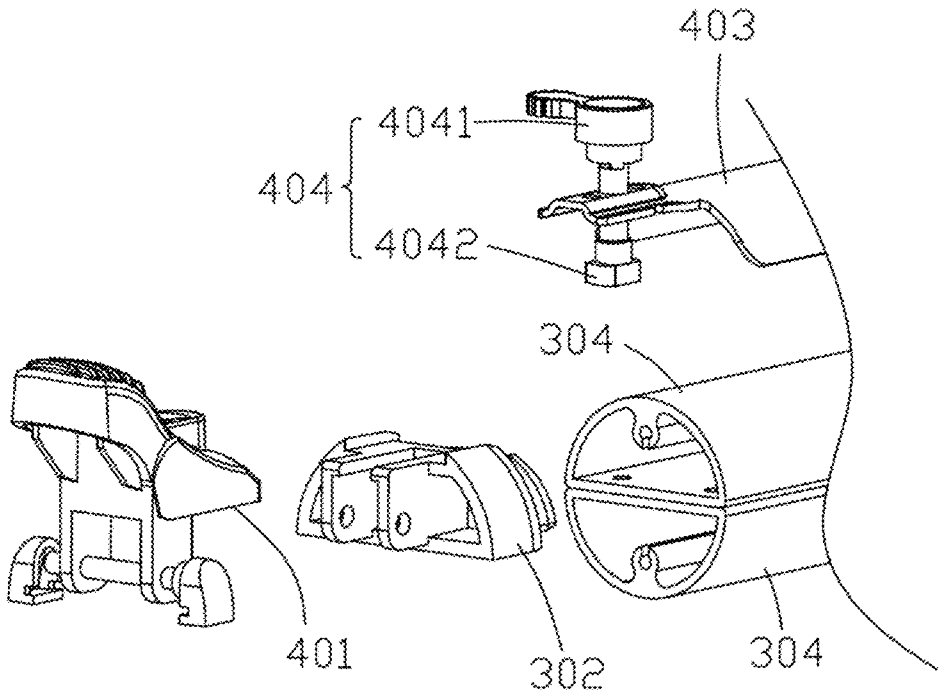
FIG. 15 is an exploded view of a part of a clamping cooperating member and a part of a hair curling bar in an embodiment of the present application.
Figure 16:
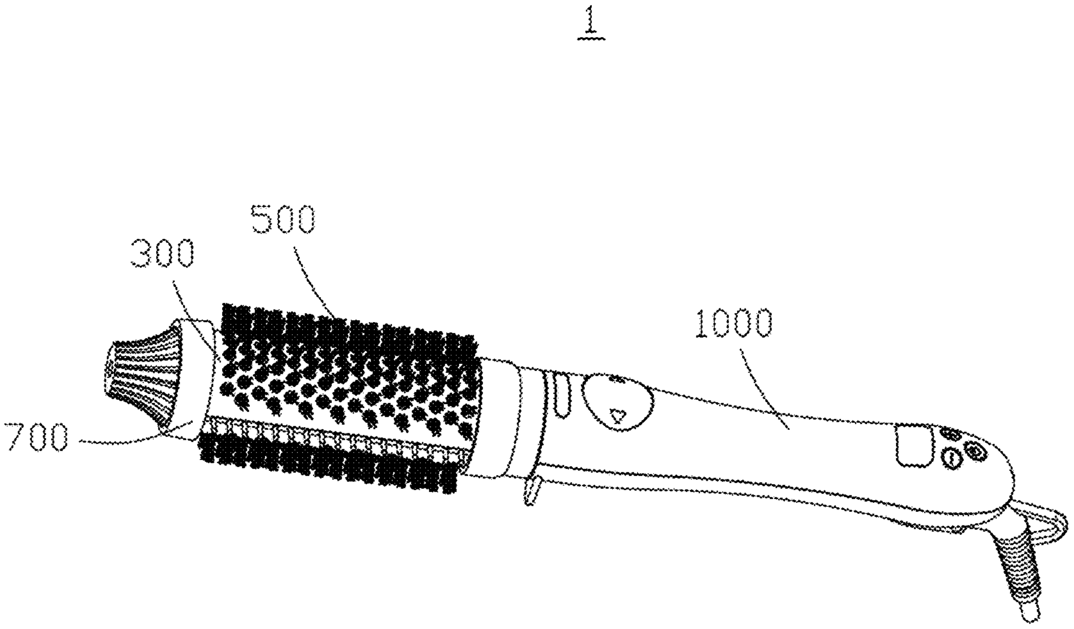
FIG. 16 is a three-dimensional structural diagram of a hairdressing device in another embodiment of the present application.

Reference is made to FIG. 13. In some embodiments, the hairdressing assembly 2000 further includes a plurality of bristles 500, where the plurality of bristles 500 are provided on the hair curling shaft 300 in an array. The bristles 500 can go deep to roots of the hair to help to fix the hair so as to facilitate winding of the hair.

The above embodiments are only the particular embodiments of the present application, but the scope of protection of the present application is not limited to these embodiments. Any modification or replacement within the scope of technologies disclosed in the present application should be included in the scope of disclosure of the present application.

What is claimed is:

1. A rotating conductive structure, the rotating conductive structure having an axis of rotation and comprising:
- an insulating member;
- a conductive rotating member, wherein the conductive rotating member comprises a first rotating portion and a second rotating portion, the first rotating portion and the second rotating portion are capable of rotating around the axis of rotation, and the first rotating portion and the second rotating portion are electrically connected to a hairdressing assembly for hair styling; and
- a conductive fixed member, wherein the conductive fixed member comprises a first fixed portion and a second fixed portion, the first fixed portion is in contact with the first rotating portion, the second fixed portion is in contact with the second rotating portion, and the conductive fixed member is fixedly mounted on a body;
- the insulating member is configured to isolate the first rotating portion from the second rotating portion and is configured to limit the first rotating portion and the second rotating portion; and
- a current passes through the first fixed portion, the first rotating portion, the hairdressing assembly, the second rotating portion and the second fixed portion in sequence to form a series circuit with a power source; and
- the first rotating portion comprises a first rotating ring and a first conductive strip, an axis of the first rotating ring overlaps the axis of rotation, and the first conductive strip extends along the axis of rotation and is connected to the first rotating ring; and
- the second rotating portion comprises a second rotating ring and a second conductive strip, an axis of the second rotating ring overlaps the axis of rotation, the second conductive strip is connected to the second rotating ring and extends along the axis of rotation, and the second conductive strip is located on one side away from the first rotating ring; and the first conductive strip penetrates through the second rotating ring, and is spaced apart from the second rotating ring.

2. The rotating conductive structure according to claim 1, further comprising an insulating protective sleeve, wherein the insulating protective sleeve is provided with a limiting rotating cavity, the conductive rotating member is rotatably connected to the limiting rotating cavity, and the insulating protective sleeve is configured to prevent the insulating member, the conductive rotating member and the conductive fixed member from deviating during operation of the hairdressing assembly.

3. The rotating conductive structure according to claim 1, wherein at least one of the first rotating portion and the first fixed portion is of an annular structure, and at least one of the second rotating portion and the second fixed portion is of an annular structure; and
- the first rotating portion is in surface contact with the first fixed portion all the time in a rotating process, and the second rotating portion is in surface contact with the second fixed portion all the time in a rotating process.

4. The rotating conductive structure according to claim 1, wherein the first fixed portion comprises a first fixed ring, and at least a part of the first fixed ring is embedded in the first rotating ring.

5. The rotating conductive structure according to claim 4, wherein the first fixed ring is provided with a notch, so that the first fixed ring is capable of being elastically deformed and shrunk to be completely embedded in the first rotating ring.

6. The rotating conductive structure according to claim 5, wherein an outer circumferential surface of the first fixed ring is a smooth surface so as to be in surface contact with an inner circumferential surface of the first rotating portion.

7. The rotating conductive structure according to claim 5, wherein the first fixed ring comprises at least one first connecting section and at least one first wave section, the first wave section comprises at least one first outer convex edge, and an outer surface of the first outer convex edge is configured to abut against an inner circumferential surface of the first rotating portion.

8. The rotating conductive structure according to claim 7, wherein there are two first wave sections, each of two ends of the first connecting section is fixedly connected to one end of one of the two first wave sections, and each of the first wave sections is provided with at least two first outer convex edges.

9. The rotating conductive structure according to claim 1, wherein the insulating member comprises an insulating ring, and an axis of the insulating ring overlaps the axis of rotation; and the insulating ring is made of an insulating material, and the insulating ring is located between the first rotating portion and the second rotating portion and is configured to control a spacing distance between the first rotating portion and the second rotating portion.

10. The rotating conductive structure according to claim 9, wherein the insulating member further comprises a blocking convex edge provided on an outer circumferential surface of the insulating ring, and the blocking convex edge is configured to prevent the second fixed portion from being separated from the second rotating portion when the first rotating portion rotates.

11. The rotating conductive structure according to claim 4, wherein the first fixed portion further comprises a first connecting strip connected to the first fixed ring, and the first connecting strip extends out of the first rotating ring to be connected to an electric wire.

12. The rotating conductive structure according to claim 2, wherein the insulating protective sleeve comprises:

an insulating front shell, wherein the limiting rotating cavity is located in the insulating front shell and is configured to accommodate the first rotating portion, the second rotating portion, the first fixed portion, the second fixed portion and the insulating member;

an insulating rear shell, wherein the insulating rear shell is detachably connected to one end of the insulating front shell; and an insulating sleeve shell, wherein the insulating sleeve shell is sleeved on the insulating front shell;

the insulating rear shell is configured to limit the first rotating portion, the second rotating portion, the first fixed portion, the second fixed portion and the insulating member to the limiting rotating cavity; and the insulating protective sleeve is sleeved on the insulating front shell so as to limit the insulating front shell to prevent the conductive rotating member from being deformed and deviating.

13. The rotating conductive structure according to claim 12, further comprising a rotating driving portion, wherein the rotating driving portion comprises:

a driving source which is mounted on an outer shell and is configured to provide power;

a connecting shell which is configured to be connected to the hairdressing assembly; and a rotating shaft, wherein an axis of the rotating shaft overlaps the axis of rotation, and the rotating shaft is fixedly mounted on one side of the connecting shell; and an output shaft of the driving source is fixedly connected to the connecting shell and/or the rotating shaft, and the rotating shaft is configured to limit the insulating member, the first rotating portion and the second rotating portion so as to drive the insulating member, the first rotating portion and the second rotating portion to rotate synchronously when the driving source drives the connecting shell and/or the rotating shaft to rotate.

14. The rotating conductive structure according to claim 13, wherein the insulating rear shell drives the insulating rear shell to abut against one side of the connecting shell facing away from the hairdressing assembly, and the insulating front shell is in surface contact with the connecting shell by means of at least a part of an abutting surface so as to reduce friction between the insulating front shell and the connecting shell.

15. A handle, comprising a handle body and the rotating conductive structure according to claim 1, wherein the rotating conductive structure is mounted in the handle body; and the handle further comprises a rotating resetting structure, one part of the rotating resetting structure is connected to the handle body, the other part is configured to be connected to the hairdressing assembly, and the rotating resetting structure is configured to achieve automatic resetting after the hairdressing assembly rotates a preset number of turns.

16. A hairdressing device, comprising a handle body, a hairdressing assembly and the rotating conductive structure according to claim 1, wherein the hairdressing assembly is located at one end of the handle body, and the rotating conductive structure is connected to the hairdressing assembly and is configured to drive the hairdressing assembly to rotate relative to the handle body.

17. The hairdressing device according to claim 16, wherein the hairdressing assembly comprises:

a hair curling shaft, wherein the hair curling shaft is connected to the rotating conductive structure, so that the hair curling shaft and the conductive rotating member rotate synchronously; and a clamping cooperating member, wherein the clamping cooperating member is connected to the hair curling shaft and cooperates with the hair curling shaft to clamp hair;

the hair curling shaft comprises a first clamping bar and a second clamping bar, the first clamping bar and the second clamping bar are capable of being opened relative to each other or performing clamping, and the clamping cooperating member is connected to the first clamping bar; and the clamping cooperating member is capable of being opened relative to the first clamping bar so as to place the hair between the clamping cooperating member and the first clamping bar, or the clamping cooperating member drives the first clamping bar to move synchronously to enable the first clamping bar to be opened relative to the second clamping bar.

18. The hairdressing device according to claim 17, wherein the hairdressing assembly further comprises a functional member, the functional member is located in the hair curling shaft, and the functional member is electrically connected to the conductive rotating member; and a current passes through the first fixed portion, the first rotating portion, the functional member, the second rotating portion and the second fixed portion in sequence.

19. The hairdressing device according to claim 16, wherein the hairdressing assembly comprises:

a hair curling shaft, wherein the hair curling shaft is connected to the rotating conductive structure, so that the hair curling shaft and the conductive rotating member rotate synchronously; and a plurality of bristles, wherein the plurality of bristles are provided in the hair curling shaft in an array; and the bristles are capable of going deep to roots of hair to help to fix the hair so as to facilitate winding of the hair.

* * * * *